US011910183B2

(12) United States Patent
Audfray et al.

(10) Patent No.: US 11,910,183 B2
(45) Date of Patent: Feb. 20, 2024

(54) MULTI-APPLICATION AUDIO RENDERING

(71) Applicant: Magic Leap, Inc., Plantation, FL (US)

(72) Inventors: Remi Samuel Audfray, San Francisco, CA (US); Mark Brandon Hertensteiner, San Jose, CA (US); Samuel Charles Dicker, San Francisco, CA (US); Blaine Ivin Wood, Eagle Mountain, UT (US); Michael Z. Land, Mill Valley, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 17/174,287

(22) Filed: Feb. 11, 2021

(65) Prior Publication Data

US 2021/0258715 A1 Aug. 19, 2021

Related U.S. Application Data

(60) Provisional application No. 62/976,569, filed on Feb. 14, 2020.

(51) Int. Cl.
*H04S 7/00* (2006.01)

(52) U.S. Cl.
CPC .............. *H04S 7/306* (2013.01); *H04S 7/304* (2013.01)

(58) Field of Classification Search
CPC ...... H04S 7/304; H04S 7/306; H04S 2400/11; H04S 2420/01; H04R 2499/11; H04R 2499/15
USPC .......................................................... 381/17
See application file for complete search history.

(56) References Cited

U.S. PATENT DOCUMENTS

| | | | | |
|---|---|---|---|---|
| 4,852,988 | A | 8/1989 | Velez | |
| 6,433,760 | B1 | 8/2002 | Vaissie | |
| 6,491,391 | B1 | 12/2002 | Blum et al. | |
| 6,647,119 | B1 * | 11/2003 | Slezak .................... | G06F 3/165 345/650 |

(Continued)

FOREIGN PATENT DOCUMENTS

| | | | |
|---|---|---|---|
| CA | 2316473 | A1 | 1/2001 |
| CA | 2362895 | A1 | 12/2002 |

(Continued)

OTHER PUBLICATIONS

International Search Report and Written Opinion dated May 3, 2021, for PCT Application No. PCT/US2021/17728, filed Feb. 11, 2021, 20 pages.

(Continued)

*Primary Examiner* — Daniel R Sellers
(74) *Attorney, Agent, or Firm* — Morrison & Foerster LLP

(57) ABSTRACT

Disclosed herein are systems and methods for efficiently rendering audio. A method may include receiving a request to present a first audio track, wherein the first audio track is based on a first audio model comprising a shared model component and a first model component; receiving a request to present a second audio track, wherein the second audio track is based on a second audio model comprising the shared model component and a second model component; rendering a sound based on the first audio track, the second audio track, the shared model component, the first model component, and the second model component; and presenting, via one or more speakers, the an audio signal comprising the rendered sound.

28 Claims, 14 Drawing Sheets

(56) References Cited

U.S. PATENT DOCUMENTS

| | | | | |
|---|---|---|---|---|
| 6,847,336 | B1 | 1/2005 | Lemelson | |
| 6,943,754 | B2 | 9/2005 | Aughey | |
| 6,977,776 | B2 | 12/2005 | Volkenandt et al. | |
| 7,347,551 | B2 | 3/2008 | Fergason et al. | |
| 7,488,294 | B2 | 2/2009 | Torch | |
| 8,235,529 | B1 | 8/2012 | Raffle | |
| 8,611,015 | B2 | 12/2013 | Wheeler | |
| 8,627,213 | B1 * | 1/2014 | Jouppi | H04M 3/568 715/848 |
| 8,638,498 | B2 | 1/2014 | Bohn et al. | |
| 8,696,113 | B2 | 4/2014 | Lewis | |
| 8,929,589 | B2 | 1/2015 | Publicover et al. | |
| 9,010,929 | B2 | 4/2015 | Lewis | |
| 9,274,338 | B2 | 3/2016 | Robbins et al. | |
| 9,292,973 | B2 | 3/2016 | Bar-zeev et al. | |
| 9,720,505 | B2 | 8/2017 | Gribetz et al. | |
| 10,013,053 | B2 | 7/2018 | Cederlund et al. | |
| 10,025,379 | B2 | 7/2018 | Drake et al. | |
| 10,757,240 | B1 * | 8/2020 | Hvidsten | G06F 3/167 |
| 2003/0030597 | A1 | 2/2003 | Geist | |
| 2006/0023158 | A1 | 2/2006 | Howell et al. | |
| 2011/0211056 | A1 | 9/2011 | Publicover et al. | |
| 2011/0213664 | A1 | 9/2011 | Osterhout | |
| 2012/0021806 | A1 | 1/2012 | Maltz | |
| 2012/0076305 | A1 * | 3/2012 | Virolainen | H04S 7/30 381/17 |
| 2012/0093320 | A1 * | 4/2012 | Flaks | H04S 7/304 381/17 |
| 2014/0195918 | A1 | 7/2014 | Friedlander | |
| 2014/0350944 | A1 | 11/2014 | Jot et al. | |
| 2015/0168731 | A1 | 6/2015 | Robbins | |
| 2017/0223478 | A1 * | 8/2017 | Jot | H04S 7/306 |
| 2018/0020312 | A1 * | 1/2018 | Visser | H04S 7/302 |
| 2018/0210695 | A1 | 7/2018 | Tsingos et al. | |
| 2018/0288553 | A1 | 10/2018 | Lee et al. | |
| 2019/0180499 | A1 | 6/2019 | Caulfield et al. | |
| 2019/0289417 | A1 * | 9/2019 | Tomlin | G06F 3/165 |
| 2021/0099826 | A1 * | 4/2021 | Hassager | H04R 5/033 |
| 2021/0258690 | A1 * | 8/2021 | De Bruijn | H04R 5/04 |

FOREIGN PATENT DOCUMENTS

| | | | |
|---|---|---|---|
| CA | 2388766 | A1 | 12/2003 |
| WO | 2019002668 | A1 | 1/2019 |

OTHER PUBLICATIONS

International Preliminary Report and Written Opinion dated Aug. 25, 2022, for PCT Application No. PCT/US2021/17728, filed Feb. 11, 2021, ten pages.

Jacob, R. "Eye Tracking in Advanced Interface Design", Virtual Environments and Advanced Interface Design, Oxford University Press, Inc. (Jun. 1995).

Rolland, J. et al., "High-resolution inset head-mounted display", Optical Society of America, vol. 37, No. 19, Applied Optics, (Jul. 1, 1998).

Tanriverdi, V. et al. (Apr. 2000). "Interacting With Eye Movements in Virtual Environments," Department of Electrical Engineering and Computer Science, Tufts University, Medford, MA 02155, USA, Proceedings of the SIGCHI conference on Human Factors in Computing Systems, eight pages.

Yoshida, A. et al., "Design and Applications of a High Resolution Insert Head Mounted Display". (Jun. 1994).

Extended European Search Report dated Jun. 21, 2023, for EP Application No. 21753406.4, nine pages.

* cited by examiner

MULTI-APPLICATION AUDIO RENDERING

CROSS-REFERENCE TO RELATED APPLICATIONS

This application claims benefit of U.S. Provisional Application No. 62/976,569, filed Feb. 14, 2020, the contents of which is incorporated herein by reference in its entirety.

FIELD

This disclosure relates in general to systems and methods for managing and storing audio data, and in particular to systems and methods for managing and storing audio data in a mixed reality environment.

BACKGROUND

Virtual environments are ubiquitous in computing environments, finding use in video games (in which a virtual environment may represent a game world); maps (in which a virtual environment may represent terrain to be navigated); simulations (in which a virtual environment may simulate a real environment); digital storytelling (in which virtual characters may interact with each other in a virtual environment); and many other applications. Modern computer users are generally comfortable perceiving, and interacting with, virtual environments. However, users' experiences with virtual environments can be limited by the technology for presenting virtual environments. For example, conventional displays (e.g., 2D display screens) and audio systems (e.g., fixed speakers) may be unable to realize a virtual environment in ways that create a compelling, realistic, and immersive experience.

Virtual reality ("VR"), augmented reality ("AR"), mixed reality ("MR"), and related technologies (collectively, "XR") share an ability to present, to a user of an XR system, sensory information corresponding to a virtual environment represented by data in a computer system. Such systems can offer a uniquely heightened sense of immersion and realism by combining virtual visual and audio cues with real sights and sounds. Accordingly, it can be desirable to present digital sounds to a user of an XR system in such a way that the sounds seem to be occurring—naturally, and consistently with the user's expectations of the sound—in the user's real environment. Generally speaking, users expect that virtual sounds will take on the acoustic properties of the real environment in which they are heard. For instance, a user of an XR system in a large concert hall will expect the virtual sounds of the XR system to have large, cavernous sonic qualities; conversely, a user in a small apartment will expect the sounds to be more dampened, close, and immediate. In addition to matching virtual sounds with acoustic properties of a real and/or virtual environment, realism is further enhanced by spatializing virtual sounds. For example, a virtual object may visually fly past a user from behind, and the user may expect the corresponding virtual sound to similarly reflect the spatial movement of the virtual object with respect to the user.

Existing technologies often fall short of these expectations, such as by presenting virtual audio that does not take into account a user's surroundings or does not correspond to spatial movements of a virtual object, leading to feelings of inauthenticity that can compromise the user experience. Observations of users of XR systems indicate that while users may be relatively forgiving of visual mismatches between virtual content and a real environment (e.g., inconsistencies in lighting); users may be more sensitive to auditory mismatches. Our own auditory experiences, refined continuously throughout our lives, can make us acutely aware of how our physical environments affect the sounds we hear; and we can be hyper-aware of sounds that are inconsistent with those expectations. With XR systems, such inconsistencies can be jarring, and can turn an immersive and compelling experience into a gimmicky, imitative one. In extreme examples, auditory inconsistencies can cause motion sickness and other ill effects as the inner ear is unable to reconcile auditory stimuli with their corresponding visual cues.

A system architecture is needed to organize and manage a system for generating virtual audio. Generating virtual audio may involve managing and storing information about a user's environment so that the information may be used to produce realistic virtual sound. An audio system architecture may therefore need to interface with other systems to receive and utilize information relevant to an audio engine. It can further be desirable to have an audio system architecture that can present realistic sounds without interruption during use. An audio system architecture than can update an audio engine without interrupting a user can produce an immersive user experience where auditory signals continuously reflect a user's environment.

By taking into account the characteristics of the user's physical environment, the systems and methods described herein can simulate what would be heard by a user if the virtual sound were a real sound, generated naturally in that environment. By presenting virtual sounds in a manner that is faithful to the way sounds behave in the real world, the user may experience a heightened sense of connectedness to the mixed reality environment. Similarly, by presenting location-aware virtual content that responds to the user's movements and environment, the content becomes more subjective, interactive, and real—for example, the user's experience at Point A can be entirely different from his or her experience at Point B. This enhanced realism and interactivity can provide a foundation for new applications of mixed reality, such as those that use spatially-aware audio to enable novel forms of gameplay, social features, or interactive behaviors.

BRIEF SUMMARY

Examples of the disclosure describe systems and methods for efficiently rendering audio. According to examples of the disclosure, a method may include receiving a request to present a first audio track, wherein the first audio track is based on a first audio model comprising a shared model component and a first model component; receiving a request to present a second audio track, wherein the second audio track is based on a second audio model comprising the shared model component and a second model component; rendering a sound based on the first audio track, the second audio track, the shared model component, the first model component, and the second model component; and presenting, via one or more speakers, an audio signal comprising the rendered sound.

DETAILED DESCRIPTION

Figure 1A:
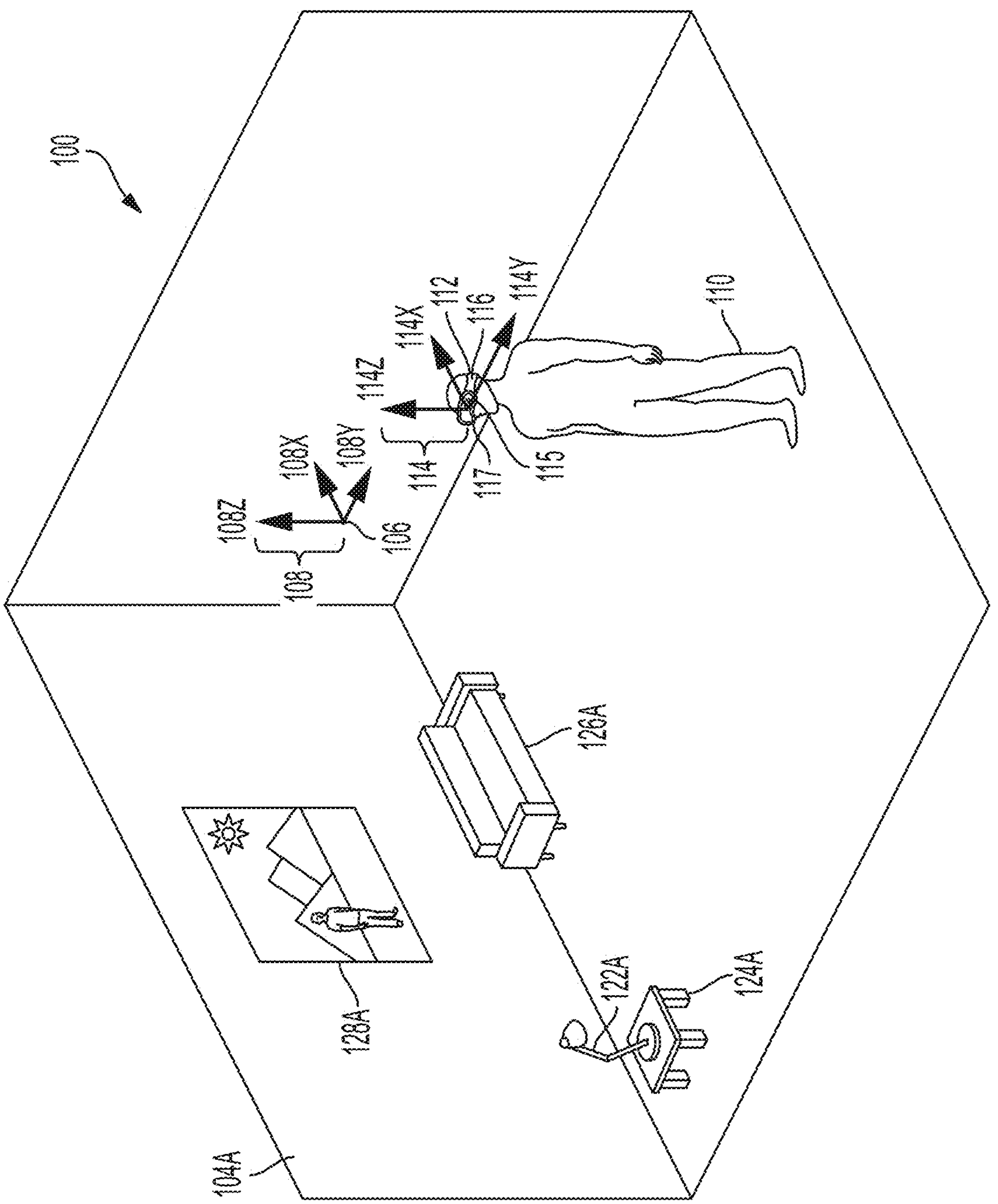
FIGS. 1A-1C illustrate an example mixed reality environment, according to some embodiments.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Mixed Reality Environment

Like all people, a user of a mixed reality system exists in a real environment—that is, a three-dimensional portion of the "real world," and all of its contents, that are perceptible by the user. For example, a user perceives a real environment using one's ordinary human senses—sight, sound, touch, taste, smell—and interacts with the real environment by moving one's own body in the real environment. Locations in a real environment can be described as coordinates in a coordinate space; for example, a coordinate can include latitude, longitude, and elevation with respect to sea level; distances in three orthogonal dimensions from a reference point; or other suitable values. Likewise, a vector can describe a quantity having a direction and a magnitude in the coordinate space.

A computing device can maintain, for example in a memory associated with the device, a representation of a virtual environment. As used herein, a virtual environment is a computational representation of a three-dimensional space. A virtual environment can include representations of any object, action, signal, parameter, coordinate, vector, or other characteristic associated with that space. In some examples, circuitry (e.g., a processor) of a computing device can maintain and update a state of a virtual environment; that is, a processor can determine at a first time t0, based on data associated with the virtual environment and/or input provided by a user, a state of the virtual environment at a second time t1. For instance, if an object in the virtual environment is located at a first coordinate at time t0, and has certain programmed physical parameters (e.g., mass, coefficient of friction); and an input received from user indicates that a force should be applied to the object in a direction vector; the processor can apply laws of kinematics to determine a location of the object at time t1 using basic mechanics. The processor can use any suitable information known about the virtual environment, and/or any suitable input, to determine a state of the virtual environment at a time t1. In maintaining and updating a state of a virtual environment, the processor can execute any suitable software, including software relating to the creation and deletion of virtual objects in the virtual environment; software (e.g., scripts) for defining behavior of virtual objects or characters in the virtual environment; software for defining the behavior of signals (e.g., audio signals) in the virtual environment; software for creating and updating parameters associated with the virtual environment; software for generating audio signals in the virtual environment; software for handling input and output; software for implementing network operations; software for applying asset data (e.g., animation data to move a virtual object over time); or many other possibilities.

Output devices, such as a display or a speaker, can present any or all aspects of a virtual environment to a user. For example, a virtual environment may include virtual objects (which may include representations of inanimate objects; people; animals; lights; etc.) that may be presented to a user. A processor can determine a view of the virtual environment (for example, corresponding to a "camera" with an origin coordinate, a view axis, and a frustum); and render, to a display, a viewable scene of the virtual environment corresponding to that view. Any suitable rendering technology may be used for this purpose. In some examples, the viewable scene may include only some virtual objects in the virtual environment, and exclude certain other virtual objects. Similarly, a virtual environment may include audio aspects that may be presented to a user as one or more audio signals. For instance, a virtual object in the virtual environment may generate a sound originating from a location coordinate of the object (e.g., a virtual character may speak or cause a sound effect); or the virtual environment may be associated with musical cues or ambient sounds that may or may not be associated with a particular location. A processor can determine an audio signal corresponding to a "listener" coordinate—for instance, an audio signal corresponding to a composite of sounds in the virtual environment, and mixed and processed to simulate an audio signal that would be heard by a listener at the listener coordinate—and present the audio signal to a user via one or more speakers.

Because a virtual environment exists only as a computational structure, a user cannot directly perceive a virtual environment using one's ordinary senses. Instead, a user can perceive a virtual environment only indirectly, as presented to the user, for example by a display, speakers, haptic output devices, etc. Similarly, a user cannot directly touch, manipulate, or otherwise interact with a virtual environment; but can provide input data, via input devices or sensors, to a processor that can use the device or sensor data to update the virtual environment. For example, a camera sensor can provide optical data indicating that a user is trying to move an object in a virtual environment, and a processor can use that data to cause the object to respond accordingly in the virtual environment.

A mixed reality system can present to the user, for example using a transmissive display and/or one or more speakers (which may, for example, be incorporated into a wearable head device), a mixed reality environment ("MRE") that combines aspects of a real environment and a virtual environment. In some embodiments, the one or more speakers may be external to the head-mounted wearable unit. As used herein, a MRE is a simultaneous representation of a real environment and a corresponding virtual environment. In some examples, the corresponding real and virtual environments share a single coordinate space; in some examples, a real coordinate space and a corresponding virtual coordinate space are related to each other by a transformation matrix (or other suitable representation).

Accordingly, a single coordinate (along with, in some examples, a transformation matrix) can define a first location in the real environment, and also a second, corresponding, location in the virtual environment; and vice versa.

In a MRE, a virtual object (e.g., in a virtual environment associated with the MRE) can correspond to a real object (e.g., in a real environment associated with the MRE). For instance, if the real environment of a MRE includes a real lamp post (a real object) at a location coordinate, the virtual environment of the MRE may include a virtual lamp post (a virtual object) at a corresponding location coordinate. As used herein, the real object in combination with its corresponding virtual object together constitute a "mixed reality object." It is not necessary for a virtual object to perfectly match or align with a corresponding real object. In some examples, a virtual object can be a simplified version of a corresponding real object. For instance, if a real environment includes a real lamp post, a corresponding virtual object may include a cylinder of roughly the same height and radius as the real lamp post (reflecting that lamp posts may be roughly cylindrical in shape). Simplifying virtual objects in this manner can allow computational efficiencies, and can simplify calculations to be performed on such virtual objects. Further, in some examples of a MRE, not all real objects in a real environment may be associated with a corresponding virtual object. Likewise, in some examples of a MRE, not all virtual objects in a virtual environment may be associated with a corresponding real object. That is, some virtual objects may solely in a virtual environment of a MRE, without any real-world counterpart.

In some examples, virtual objects may have characteristics that differ, sometimes drastically, from those of corresponding real objects. For instance, while a real environment in a MRE may include a green, two-armed cactus—a prickly inanimate object—a corresponding virtual object in the MRE may have the characteristics of a green, two-armed virtual character with human facial features and a surly demeanor. In this example, the virtual object resembles its corresponding real object in certain characteristics (color, number of arms); but differs from the real object in other characteristics (facial features, personality). In this way, virtual objects have the potential to represent real objects in a creative, abstract, exaggerated, or fanciful manner; or to impart behaviors (e.g., human personalities) to otherwise inanimate real objects. In some examples, virtual objects may be purely fanciful creations with no real-world counterpart (e.g., a virtual monster in a virtual environment, perhaps at a location corresponding to an empty space in a real environment).

Compared to VR systems, which present the user with a virtual environment while obscuring the real environment, a mixed reality system presenting a MRE affords the advantage that the real environment remains perceptible while the virtual environment is presented. Accordingly, the user of the mixed reality system is able to use visual and audio cues associated with the real environment to experience and interact with the corresponding virtual environment. As an example, while a user of VR systems may struggle to perceive or interact with a virtual object displayed in a virtual environment—because, as noted above, a user cannot directly perceive or interact with a virtual environment—a user of a MR system may find it intuitive and natural to interact with a virtual object by seeing, hearing, and touching a corresponding real object in his or her own real environment. This level of interactivity can heighten a user's feelings of immersion, connection, and engagement with a virtual environment. Similarly, by simultaneously presenting a real environment and a virtual environment, mixed reality systems can reduce negative psychological feelings (e.g., cognitive dissonance) and negative physical feelings (e.g., motion sickness) associated with VR systems. Mixed reality systems further offer many possibilities for applications that may augment or alter our experiences of the real world.

FIG. 1A illustrates an example real environment 100 in which a user 110 uses a mixed reality system 112. Mixed reality system 112 may include a display (e.g., a transmissive display) and one or more speakers, and one or more sensors (e.g., a camera), for example as described below. The real environment 100 shown includes a rectangular room 104A, in which user 110 is standing; and real objects 122A (a lamp), 124A (a table), 126A (a sofa), and 128A (a painting). Room 104A further includes a location coordinate 106, which may be considered an origin of the real environment 100. As shown in FIG. 1A, an environment/world coordinate system 108 (comprising an x-axis 108X, a y-axis 108Y, and a z-axis 108Z) with its origin at point 106 (a world coordinate), can define a coordinate space for real environment 100. In some embodiments, the origin point 106 of the environment/world coordinate system 108 may correspond to where the mixed reality system 112 was powered on. In some embodiments, the origin point 106 of the environment/world coordinate system 108 may be reset during operation. In some examples, user 110 may be considered a real object in real environment 100; similarly, user 110's body parts (e.g., hands, feet) may be considered real objects in real environment 100. In some examples, a user/listener/head coordinate system 114 (comprising an x-axis 114X, a y-axis 114Y, and a z-axis 114Z) with its origin at point 115 (e.g., user/listener/head coordinate) can define a coordinate space for the user/listener/head on which the mixed reality system 112 is located. The origin point 115 of the user/listener/head coordinate system 114 may be defined relative to one or more components of the mixed reality system 112. For example, the origin point 115 of the user/listener/head coordinate system 114 may be defined relative to the display of the mixed reality system 112 such as during initial calibration of the mixed reality system 112. A matrix (which may include a translation matrix and a Quaternion matrix or other rotation matrix), or other suitable representation can characterize a transformation between the user/listener/head coordinate system 114 space and the environment/world coordinate system 108 space. In some embodiments, a left ear coordinate 116 and a right ear coordinate 117 may be defined relative to the origin point 115 of the user/listener/head coordinate system 114. A matrix (which may include a translation matrix and a Quaternion matrix or other rotation matrix), or other suitable representation can characterize a transformation between the left ear coordinate 116 and the right ear coordinate 117, and user/listener/head coordinate system 114 space. The user/listener/head coordinate system 114 can simplify the representation of locations relative to the user's head, or to a head-mounted device, for example, relative to the environment/world coordinate system 108. Using Simultaneous Localization and Mapping (SLAM), visual odometry, or other techniques, a transformation between user coordinate system 114 and environment coordinate system 108 can be determined and updated in real-time.

Figure 1B:
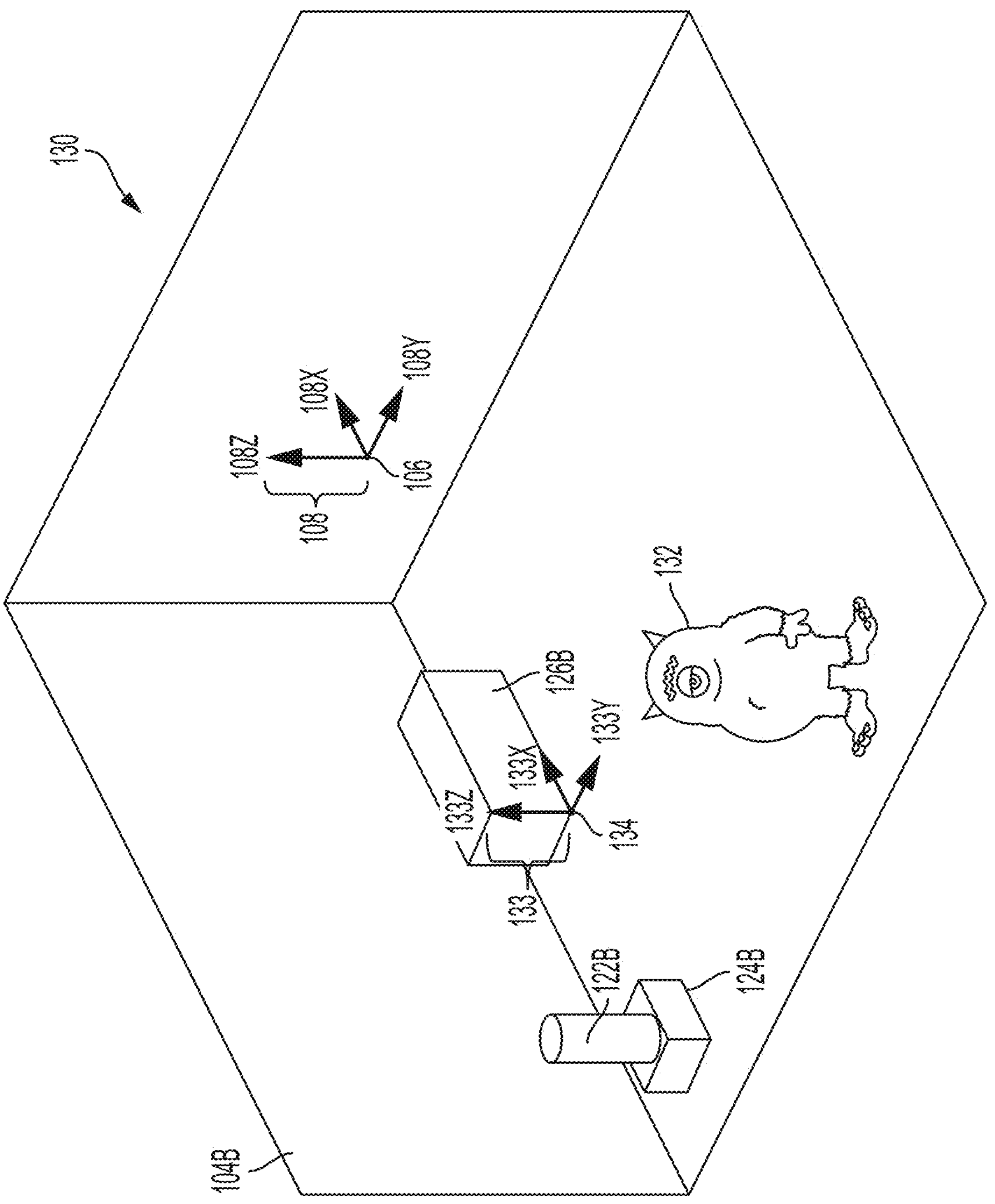

FIG. 1B illustrates an example virtual environment 130 that corresponds to real environment 100. The virtual environment 130 shown includes a virtual rectangular room 104B corresponding to real rectangular room 104A; a virtual object 122B corresponding to real object 122A; a virtual object 124B corresponding to real object 124A; and a virtual object 126B corresponding to real object 126A. Metadata associated with the virtual objects 122B, 124B, 126B can include information derived from the corresponding real objects 122A, 124A, 126A. Virtual environment 130 additionally includes a virtual monster 132, which does not correspond to any real object in real environment 100. Real object 128A in real environment 100 does not correspond to any virtual object in virtual environment 130. A persistent coordinate system 133 (comprising an x-axis 133X, a y-axis 133Y, and a z-axis 133Z) with its origin at point 134 (persistent coordinate), can define a coordinate space for virtual content. The origin point 134 of the persistent coordinate system 133 may be defined relative/with respect to one or more real objects, such as the real object 126A. A matrix (which may include a translation matrix and a Quaternion matrix or other rotation matrix), or other suitable representation can characterize a transformation between the persistent coordinate system 133 space and the environment/world coordinate system 108 space. In some embodiments, each of the virtual objects 122B, 124B, 126B, and 132 may have their own persistent coordinate point relative to the origin point 134 of the persistent coordinate system 133. In some embodiments, there may be multiple persistent coordinate systems and each of the virtual objects 122B, 124B, 126B, and 132 may have their own persistent coordinate point relative to one or more persistent coordinate systems.

With respect to FIGS. 1A and 1B, environment/world coordinate system 108 defines a shared coordinate space for both real environment 100 and virtual environment 130. In the example shown, the coordinate space has its origin at point 106. Further, the coordinate space is defined by the same three orthogonal axes (108X, 108Y, 108Z). Accordingly, a first location in real environment 100, and a second, corresponding location in virtual environment 130, can be described with respect to the same coordinate space. This simplifies identifying and displaying corresponding locations in real and virtual environments, because the same coordinates can be used to identify both locations. However, in some examples, corresponding real and virtual environments need not use a shared coordinate space. For instance, in some examples (not shown), a matrix (which may include a translation matrix and a Quaternion matrix or other rotation matrix), or other suitable representation can characterize a transformation between a real environment coordinate space and a virtual environment coordinate space.

Figure 1C:
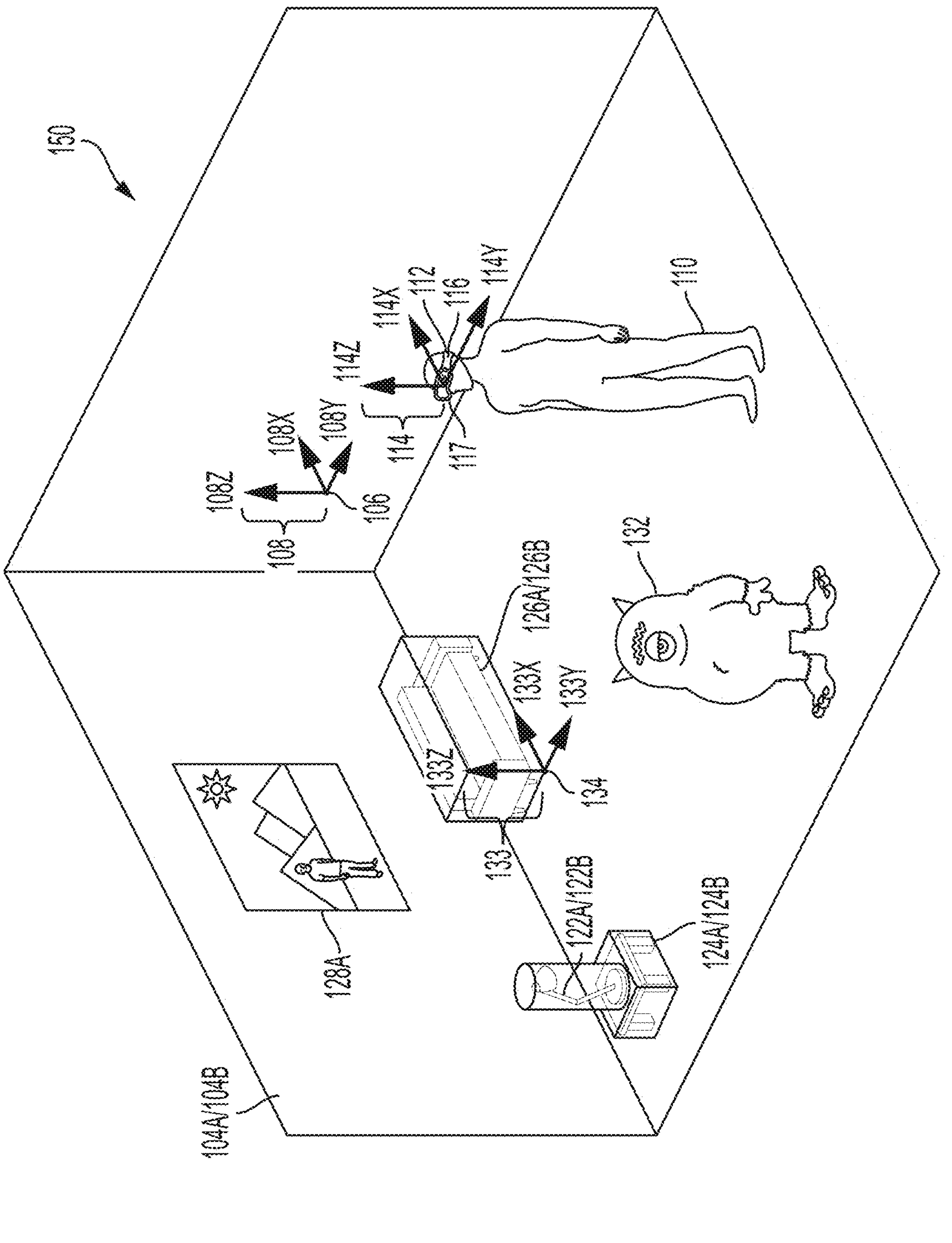

FIG. 1C illustrates an example MRE 150 that simultaneously presents aspects of real environment 100 and virtual environment 130 to user 110 via mixed reality system 112. In the example shown, MRE 150 simultaneously presents user 110 with real objects 122A, 124A, 126A, and 128A from real environment 100 (e.g., via a transmissive portion of a display of mixed reality system 112); and virtual objects 122B, 124B, 126B, and 132 from virtual environment 130 (e.g., via an active display portion of the display of mixed reality system 112). As above, origin point 106 acts as an origin for a coordinate space corresponding to MRE 150, and coordinate system 108 defines an x-axis, y-axis, and z-axis for the coordinate space.

In the example shown, mixed reality objects include corresponding pairs of real objects and virtual objects (i.e., 122A/122B, 124A/124B, 126A/126B) that occupy corresponding locations in coordinate space 108. In some examples, both the real objects and the virtual objects may be simultaneously visible to user 110. This may be desirable in, for example, instances where the virtual object presents information designed to augment a view of the corresponding real object (such as in a museum application where a virtual object presents the missing pieces of an ancient damaged sculpture). In some examples, the virtual objects (122B, 124B, and/or 126B) may be displayed (e.g., via active pixelated occlusion using a pixelated occlusion shutter) so as to occlude the corresponding real objects (122A, 124A, and/or 126A). This may be desirable in, for example, instances where the virtual object acts as a visual replacement for the corresponding real object (such as in an interactive storytelling application where an inanimate real object becomes a "living" character).

In some examples, real objects (e.g., 122A, 124A, 126A) may be associated with virtual content or helper data that may not necessarily constitute virtual objects. Virtual content or helper data can facilitate processing or handling of virtual objects in the mixed reality environment. For example, such virtual content could include two-dimensional representations of corresponding real objects; custom asset types associated with corresponding real objects; or statistical data associated with corresponding real objects. This information can enable or facilitate calculations involving a real object without incurring unnecessary computational overhead.

In some examples, the presentation described above may also incorporate audio aspects. For instance, in MRE 150, virtual monster 132 could be associated with one or more audio signals, such as a footstep sound effect that is generated as the monster walks around MRE 150. As described further below, a processor of mixed reality system 112 can compute an audio signal corresponding to a mixed and processed composite of all such sounds in MRE 150, and present the audio signal to user 110 via one or more speakers included in mixed reality system 112 and/or one or more external speakers.

Example Mixed Reality System

Example mixed reality system 112 can include a wearable head device (e.g., a wearable augmented reality or mixed reality head device) comprising a display (which may include left and right transmissive displays, which may be near-eye displays, and associated components for coupling light from the displays to the user's eyes); left and right speakers (e.g., positioned adjacent to the user's left and right ears, respectively); an inertial measurement unit (IMU) (e.g., mounted to a temple arm of the head device); an orthogonal coil electromagnetic receiver (e.g., mounted to the left temple piece); left and right cameras (e.g., depth (time-of-flight) cameras) oriented away from the user; and left and right eye cameras oriented toward the user (e.g., for detecting the user's eye movements). However, a mixed reality system 112 can incorporate any suitable display technology, and any suitable sensors (e.g., optical, infrared, acoustic, LIDAR, EOG, GPS, magnetic). In addition, mixed reality system 112 may incorporate networking features (e.g., Wi-Fi capability) to communicate with other devices and systems, including other mixed reality systems. Mixed reality system 112 may further include a battery (which may be mounted in an auxiliary unit, such as a belt pack designed to be worn around a user's waist), a processor, and a memory. The wearable head device of mixed reality system 112 may include tracking components, such as an IMU or other suitable sensors, configured to output a set of coordinates of the wearable head device relative to the user's environment. In some examples, tracking components may provide input to a processor performing a Simultaneous Localization and Mapping (SLAM) and/or visual odometry algorithm. In some examples, mixed reality system 112 may also include a handheld controller 300, and/or an auxiliary unit 320, which may be a wearable beltpack, as described further below.

Figure 2A:
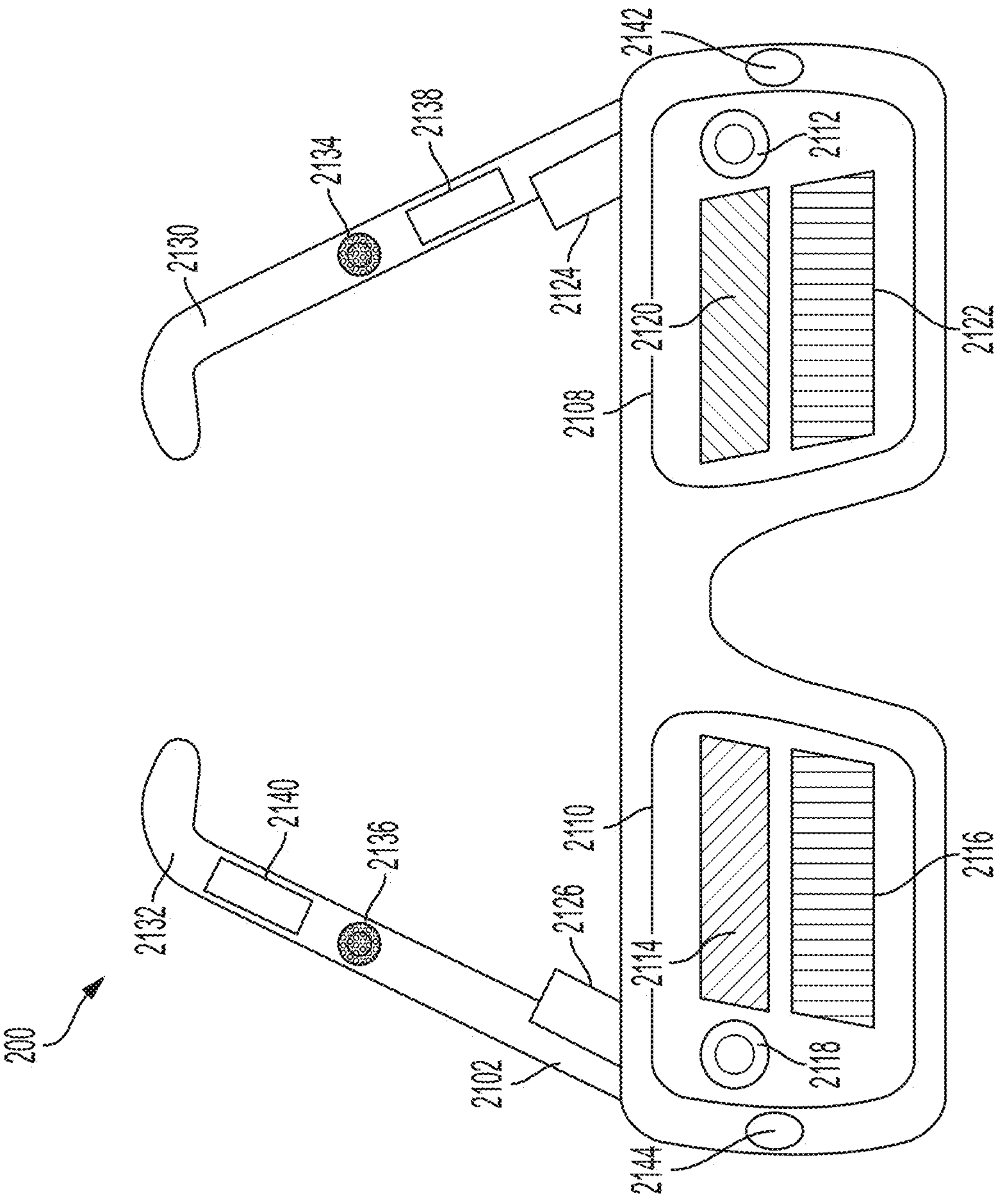
FIGS. 2A-2D illustrate components of an example mixed reality system that can be used to generate and interact with a mixed reality environment, according to some embodiments.
Figure 2B:
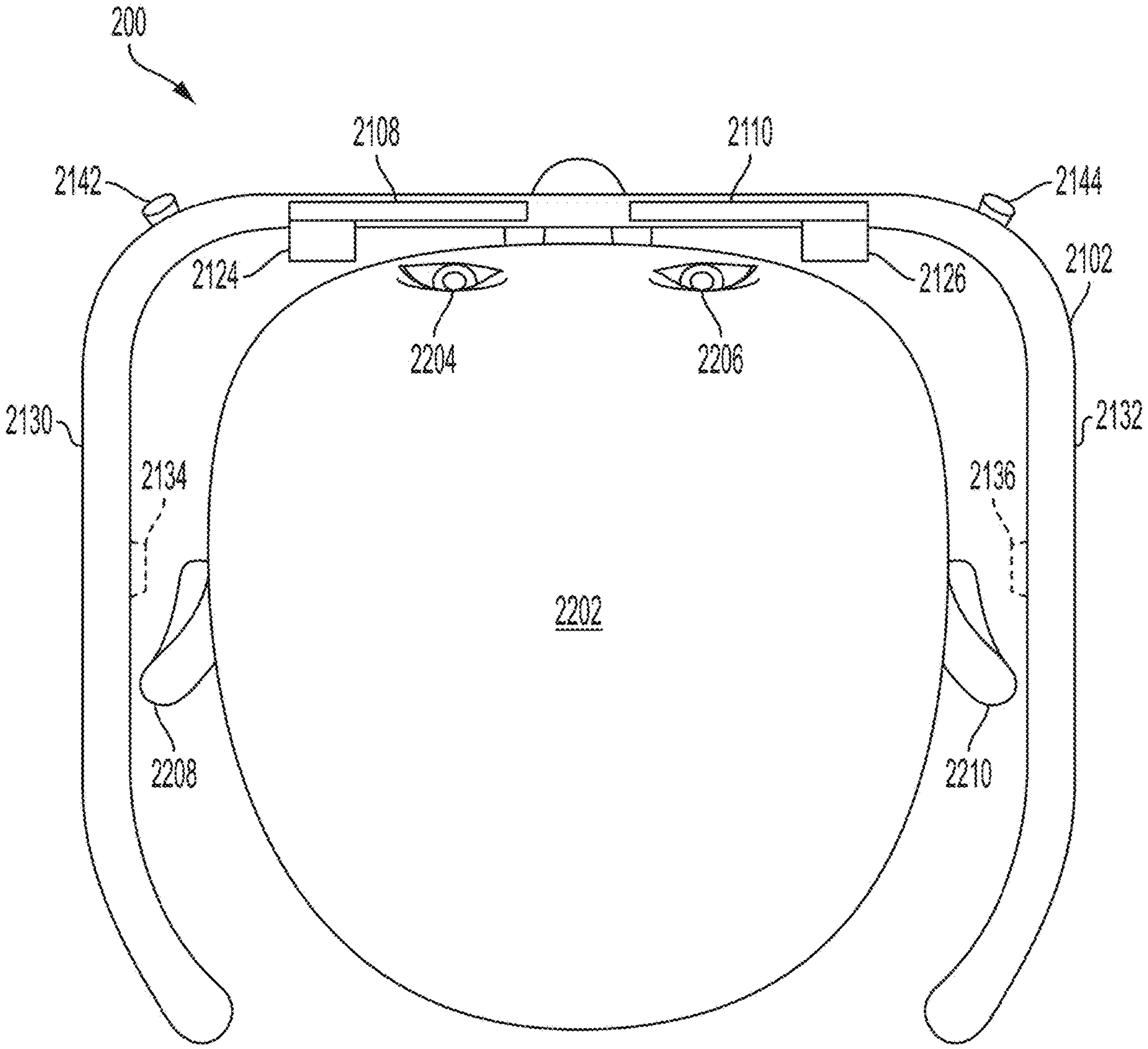
Figure 2C:
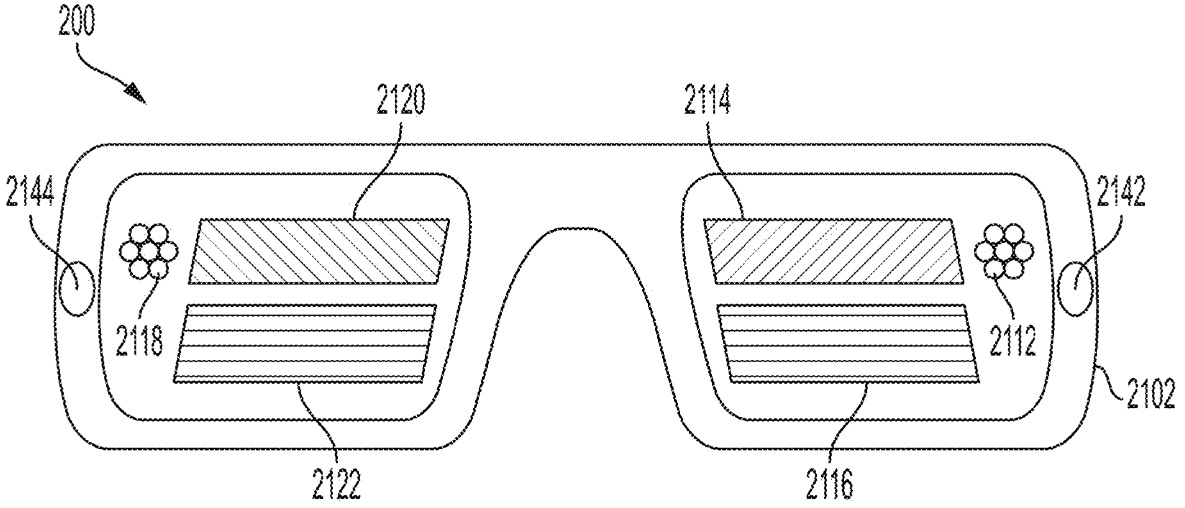
Figure 2D:
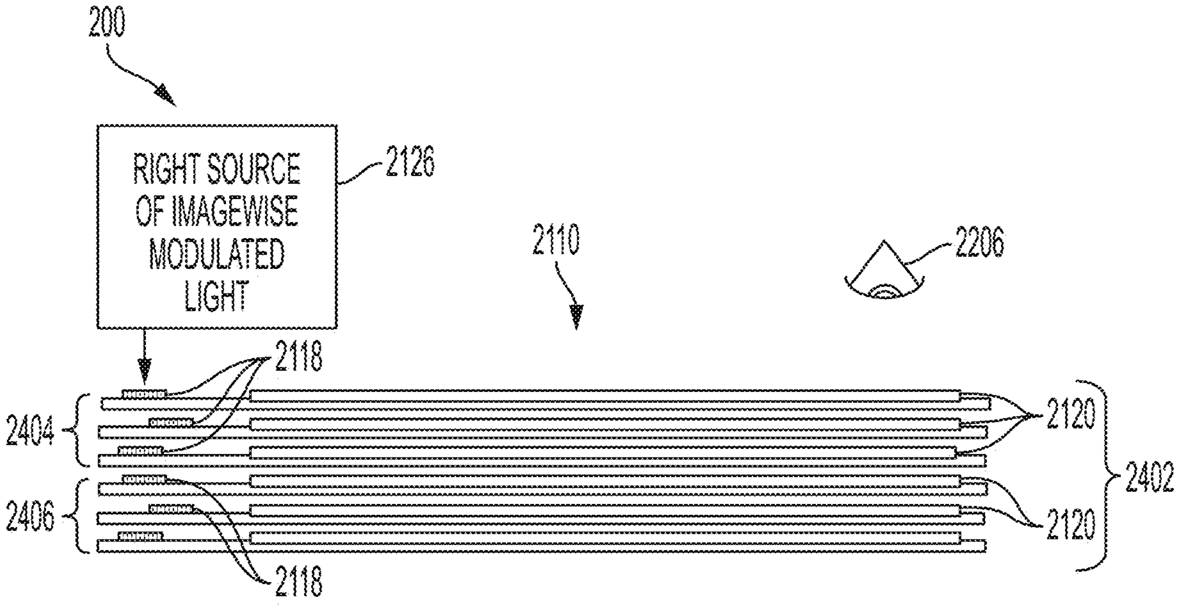

FIGS. 2A-2D illustrate components of an example mixed reality system 200 (which may correspond to mixed reality system 112) that may be used to present a MRE (which may correspond to MRE 150), or other virtual environment, to a user. FIG. 2A illustrates a perspective view of a wearable head device 2102 included in example mixed reality system 200. FIG. 2B illustrates a top view of wearable head device 2102 worn on a user's head 2202. FIG. 2C illustrates a front view of wearable head device 2102. FIG. 2D illustrates an edge view of example eyepiece 2110 of wearable head device 2102. As shown in FIGS. 2A-2C, the example wearable head device 2102 includes an example left eyepiece (e.g., a left transparent waveguide set eyepiece) 2108 and an example right eyepiece (e.g., a right transparent waveguide set eyepiece) 2110. Each eyepiece 2108 and 2110 can include transmissive elements through which a real environment can be visible, as well as display elements for presenting a display (e.g., via imagewise modulated light) overlapping the real environment. In some examples, such display elements can include surface diffractive optical elements for controlling the flow of imagewise modulated light. For instance, the left eyepiece 2108 can include a left incoupling grating set 2112, a left orthogonal pupil expansion (OPE) grating set 2120, and a left exit (output) pupil expansion (EPE) grating set 2122. Similarly, the right eyepiece 2110 can include a right incoupling grating set 2118, a right OPE grating set 2114 and a right EPE grating set 2116. Imagewise modulated light can be transferred to a user's eye via the incoupling gratings 2112 and 2118, OPEs 2114 and 2120, and EPE 2116 and 2122. Each incoupling grating set 2112, 2118 can be configured to deflect light toward its corresponding OPE grating set 2120, 2114. Each OPE grating set 2120, 2114 can be designed to incrementally deflect light down toward its associated EPE 2122, 2116, thereby horizontally extending an exit pupil being formed. Each EPE 2122, 2116 can be configured to incrementally redirect at least a portion of light received from its corresponding OPE grating set 2120, 2114 outward to a user eyebox position (not shown) defined behind the eyepieces 2108, 2110, vertically extending the exit pupil that is formed at the eyebox. Alternatively, in lieu of the incoupling grating sets 2112 and 2118, OPE grating sets 2114 and 2120, and EPE grating sets 2116 and 2122, the eyepieces 2108 and 2110 can include other arrangements of gratings and/or refractive and reflective features for controlling the coupling of imagewise modulated light to the user's eyes.

In some examples, wearable head device 2102 can include a left temple arm 2130 and a right temple arm 2132, where the left temple arm 2130 includes a left speaker 2134 and the right temple arm 2132 includes a right speaker 2136. An orthogonal coil electromagnetic receiver 2138 can be located in the left temple piece, or in another suitable location in the wearable head unit 2102. An Inertial Measurement Unit (IMU) 2140 can be located in the right temple arm 2132, or in another suitable location in the wearable head device 2102. The wearable head device 2102 can also include a left depth (e.g., time-of-flight) camera 2142 and a right depth camera 2144. The depth cameras 2142, 2144 can be suitably oriented in different directions so as to together cover a wider field of view.

In the example shown in FIGS. 2A-2D, a left source of imagewise modulated light 2124 can be optically coupled into the left eyepiece 2108 through the left incoupling grating set 2112, and a right source of imagewise modulated light 2126 can be optically coupled into the right eyepiece 2110 through the right incoupling grating set 2118. Sources of imagewise modulated light 2124, 2126 can include, for example, optical fiber scanners; projectors including electronic light modulators such as Digital Light Processing (DLP) chips or Liquid Crystal on Silicon (LCoS) modulators; or emissive displays, such as micro Light Emitting Diode (μLED) or micro Organic Light Emitting Diode (μOLED) panels coupled into the incoupling grating sets 2112, 2118 using one or more lenses per side. The input coupling grating sets 2112, 2118 can deflect light from the sources of imagewise modulated light 2124, 2126 to angles above the critical angle for Total Internal Reflection (TIR) for the eyepieces 2108, 2110. The OPE grating sets 2114, 2120 incrementally deflect light propagating by TIR down toward the EPE grating sets 2116, 2122. The EPE grating sets 2116, 2122 incrementally couple light toward the user's face, including the pupils of the user's eyes.

In some examples, as shown in FIG. 2D, each of the left eyepiece 2108 and the right eyepiece 2110 includes a plurality of waveguides 2402. For example, each eyepiece 2108, 2110 can include multiple individual waveguides, each dedicated to a respective color channel (e.g., red, blue and green). In some examples, each eyepiece 2108, 2110 can include multiple sets of such waveguides, with each set configured to impart different wavefront curvature to emitted light. The wavefront curvature may be convex with respect to the user's eyes, for example to present a virtual object positioned a distance in front of the user (e.g., by a distance corresponding to the reciprocal of wavefront curvature). In some examples, EPE grating sets 2116, 2122 can include curved grating grooves to effect convex wavefront curvature by altering the Poynting vector of exiting light across each EPE.

In some examples, to create a perception that displayed content is three-dimensional, stereoscopically-adjusted left and right eye imagery can be presented to the user through the imagewise light modulators 2124, 2126 and the eyepieces 2108, 2110. The perceived realism of a presentation of a three-dimensional virtual object can be enhanced by selecting waveguides (and thus corresponding the wavefront curvatures) such that the virtual object is displayed at a distance approximating a distance indicated by the stereoscopic left and right images. This technique may also reduce motion sickness experienced by some users, which may be caused by differences between the depth perception cues provided by stereoscopic left and right eye imagery, and the autonomic accommodation (e.g., object distance-dependent focus) of the human eye.

FIG. 2D illustrates an edge-facing view from the top of the right eyepiece 2110 of example wearable head device 2102. As shown in FIG. 2D, the plurality of waveguides 2402 can include a first subset of three waveguides 2404 and a second subset of three waveguides 2406. The two subsets of waveguides 2404, 2406 can be differentiated by different EPE gratings featuring different grating line curvatures to impart different wavefront curvatures to exiting light. Within each of the subsets of waveguides 2404, 2406 each waveguide can be used to couple a different spectral channel (e.g., one of red, green and blue spectral channels) to the user's right eye 2206. (Although not shown in FIG. 2D, the structure of the left eyepiece 2108 is analogous to the structure of the right eyepiece 2110.)

Figure 3A:
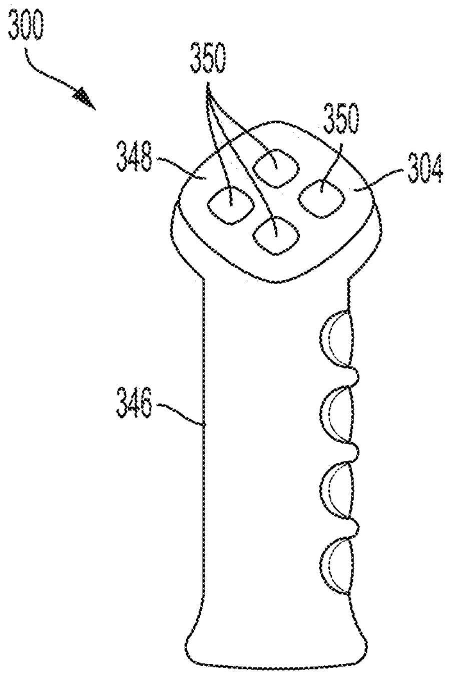
FIG. 3A illustrates an example mixed reality handheld controller that can be used to provide input to a mixed reality environment, according to some embodiments.

FIG. 3A illustrates an example handheld controller component 300 of a mixed reality system 200. In some examples, handheld controller 300 includes a grip portion 346 and one or more buttons 350 disposed along a top surface 348. In some examples, buttons 350 may be configured for use as an optical tracking target, e.g., for tracking six-degree-of-freedom (6DOF) motion of the handheld controller 300, in conjunction with a camera or other optical sensor (which may be mounted in a head unit (e.g., wearable head device 2102) of mixed reality system 200). In some examples, handheld controller 300 includes tracking components (e.g., an IMU or other suitable sensors) for detecting position or orientation, such as position or orientation relative to wearable head device 2102. In some examples, such tracking components may be positioned in a handle of handheld controller 300, and/or may be mechanically coupled to the handheld controller. Handheld controller 300 can be configured to provide one or more output signals corresponding to one or more of a pressed state of the buttons; or a position, orientation, and/or motion of the handheld controller 300 (e.g., via an IMU). Such output signals may be used as input to a processor of mixed reality system 200. Such input may correspond to a position, orientation, and/or movement of the handheld controller (and, by extension, to a position, orientation, and/or movement of a hand of a user holding the controller). Such input may also correspond to a user pressing buttons 350.

Figure 3B:
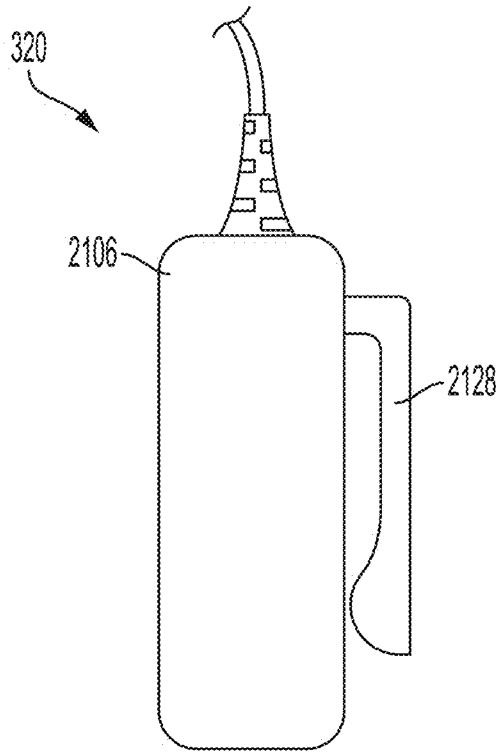
FIG. 3B illustrates an example auxiliary unit that can be used with an example mixed reality system, according to some embodiments.

FIG. 3B illustrates an example auxiliary unit 320 of a mixed reality system 200. The auxiliary unit 320 can include a battery to provide energy to operate the system 200, and can include a processor for executing programs to operate the system 200. As shown, the example auxiliary unit 320 includes a clip 2128, such as for attaching the auxiliary unit 320 to a user's belt. Other form factors are suitable for auxiliary unit 320 and will be apparent, including form factors that do not involve mounting the unit to a user's belt. In some examples, auxiliary unit 320 is coupled to the wearable head device 2102 through a multiconduit cable that can include, for example, electrical wires and fiber optics. Wireless connections between the auxiliary unit 320 and the wearable head device 2102 can also be used.

In some examples, mixed reality system 200 can include one or more microphones to detect sound and provide corresponding signals to the mixed reality system. In some examples, a microphone may be attached to, or integrated with, wearable head device 2102, and may be configured to detect a user's voice. In some examples, a microphone may be attached to, or integrated with, handheld controller 300 and/or auxiliary unit 320. Such a microphone may be configured to detect environmental sounds, ambient noise, voices of a user or a third party, or other sounds.

Figure 4:
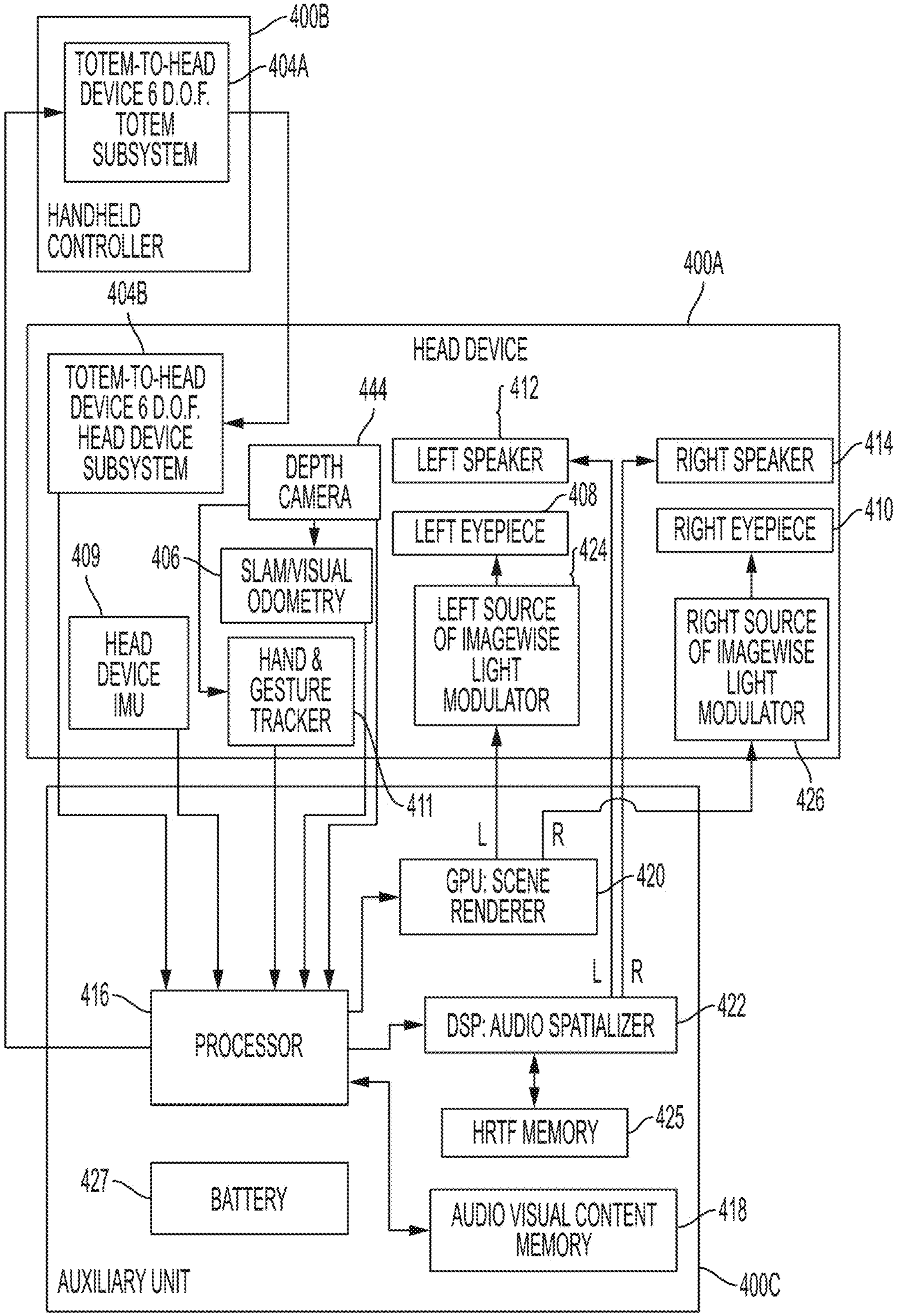
FIG. 4 illustrates an example functional block diagram for an example mixed reality system, according to some embodiments.

FIG. 4 shows an example functional block diagram that may correspond to an example mixed reality system, such as mixed reality system 200 described above (which may correspond to mixed reality system 112 with respect to FIG. 1). As shown in FIG. 4, example handheld controller 400B (which may correspond to handheld controller 300 (a "totem")) includes a totem-to-wearable head device six degree of freedom (6DOF) totem subsystem 404A and example wearable head device 400A (which may correspond to wearable head device 2102) includes a totem-to-wearable head device 6DOF subsystem 404B. In the example, the 6DOF totem subsystem 404A and the 6DOF subsystem 404B cooperate to determine six coordinates (e.g., offsets in three translation directions and rotation along three axes) of the handheld controller 400B relative to the wearable head device 400A. The six degrees of freedom may be expressed relative to a coordinate system of the wearable head device 400A. The three translation offsets may be expressed as X, Y, and Z offsets in such a coordinate system, as a translation matrix, or as some other representation. The rotation degrees of freedom may be expressed as sequence of yaw, pitch and roll rotations, as a rotation matrix, as a quaternion, or as some other representation. In some examples, the wearable head device 400A; one or more depth cameras 444 (and/or one or more non-depth cameras) included in the wearable head device 400A; and/or one or more optical targets (e.g., buttons 350 of handheld controller 400B as described above, or dedicated optical targets included in the handheld controller 400B) can be used for 6DOF tracking. In some examples, the handheld controller 400B can include a camera, as described above; and the wearable head device 400A can include an optical target for optical tracking in conjunction with the camera. In some examples, the wearable head device 400A and the handheld controller 400B each include a set of three orthogonally oriented solenoids which are used to wirelessly send and receive three distinguishable signals. By measuring the relative magnitude of the three distinguishable signals received in each of the coils used for receiving, the 6DOF of the wearable head device 400A relative to the handheld controller 400B may be determined. Additionally, 6DOF totem subsystem 404A can include an Inertial Measurement Unit (IMU) that is useful to provide improved accuracy and/or more timely information on rapid movements of the handheld controller 400B.

In some examples, it may become necessary to transform coordinates from a local coordinate space (e.g., a coordinate space fixed relative to the wearable head device 400A) to an inertial coordinate space (e.g., a coordinate space fixed relative to the real environment), for example in order to compensate for the movement of the wearable head device 400A relative to the coordinate system 108. For instance, such transformations may be necessary for a display of the wearable head device 400A to present a virtual object at an expected position and orientation relative to the real environment (e.g., a virtual person sitting in a real chair, facing forward, regardless of the wearable head device's position and orientation), rather than at a fixed position and orientation on the display (e.g., at the same position in the right lower corner of the display), to preserve the illusion that the virtual object exists in the real environment (and does not, for example, appear positioned unnaturally in the real environment as the wearable head device 400A shifts and rotates). In some examples, a compensatory transformation between coordinate spaces can be determined by processing imagery from the depth cameras 444 using a SLAM and/or visual odometry procedure in order to determine the transformation of the wearable head device 400A relative to the coordinate system 108. In the example shown in FIG. 4, the depth cameras 444 are coupled to a SLAM/visual odometry block 406 and can provide imagery to block 406. The SLAM/visual odometry block 406 implementation can include a processor configured to process this imagery and determine a position and orientation of the user's head, which can then be used to identify a transformation between a head coordinate space and another coordinate space (e.g., an inertial coordinate space). Similarly, in some examples, an additional source of information on the user's head pose and location is obtained from an IMU 409. Information from the IMU 409 can be integrated with information from the SLAM/visual odometry block 406 to provide improved accuracy and/or more timely information on rapid adjustments of the user's head pose and position.

In some examples, the depth cameras 444 can supply 3D imagery to a hand gesture tracker 411, which may be implemented in a processor of the wearable head device 400A. The hand gesture tracker 411 can identify a user's hand gestures, for example by matching 3D imagery received from the depth cameras 444 to stored patterns representing hand gestures. Other suitable techniques of identifying a user's hand gestures will be apparent.

In some examples, one or more processors 416 may be configured to receive data from the wearable head device's 6DOF headgear subsystem 404B, the IMU 409, the SLAM/visual odometry block 406, depth cameras 444, and/or the hand gesture tracker 411. The processor 416 can also send and receive control signals from the 6DOF totem system 404A. The processor 416 may be coupled to the 6DOF totem system 404A wirelessly, such as in examples where the handheld controller 400B is untethered. Processor 416 may further communicate with additional components, such as an audio-visual content memory 418, a Graphical Processing Unit (GPU) 420, and/or a Digital Signal Processor (DSP) audio spatializer 422. The DSP audio spatializer 422 may be coupled to a Head Related Transfer Function (HRTF) memory 425. The GPU 420 can include a left channel output coupled to the left source of imagewise modulated light 424 and a right channel output coupled to the right source of imagewise modulated light 426. GPU 420 can output stereoscopic image data to the sources of imagewise modulated light 424, 426, for example as described above with respect to FIGS. 2A-2D. The DSP audio spatializer 422 can output audio to a left speaker 412 and/or a right speaker 414. The DSP audio spatializer 422 can receive input from processor 419 indicating a direction vector from a user to a virtual sound source (which may be moved by the user, e.g., via the handheld controller 320). Based on the direction vector, the DSP audio spatializer 422 can determine a corresponding HRTF (e.g., by accessing a HRTF, or by interpolating multiple HRTFs). The DSP audio spatializer 422 can then apply the determined HRTF to an audio signal, such as an audio signal corresponding to a virtual sound generated by a virtual object. This can enhance the believability and realism of the virtual sound, by incorporating the relative position and orientation of the user relative to the virtual sound in the mixed reality environment—that is, by presenting a virtual sound that matches a user's expectations of what that virtual sound would sound like if it were a real sound in a real environment.

In some examples, such as shown in FIG. 4, one or more of processor 416, GPU 420, DSP audio spatializer 422, HRTF memory 425, and audio/visual content memory 418 may be included in an auxiliary unit 400C (which may correspond to auxiliary unit 320 described above). The auxiliary unit 400C may include a battery 427 to power its components and/or to supply power to the wearable head device 400A or handheld controller 400B. Including such components in an auxiliary unit, which can be mounted to a user's waist, can limit the size and weight of the wearable head device 400A, which can in turn reduce fatigue of a user's head and neck.

While FIG. 4 presents elements corresponding to various components of an example mixed reality system, various other suitable arrangements of these components will become apparent to those skilled in the art. For example, elements presented in FIG. 4 as being associated with auxiliary unit 400C could instead be associated with the wearable head device 400A or handheld controller 400B. Furthermore, some mixed reality systems may forgo entirely a handheld controller 400B or auxiliary unit 400C. Such changes and modifications are to be understood as being included within the scope of the disclosed examples.

Environmental Acoustic Persistence

As described above, a MRE (such as experienced via a mixed reality system, e.g., mixed reality system 112, which may include components such as a wearable head unit 200, handheld controller 300, or auxiliary unit 320 described above) can present audio signals that appear, to a user of the MRE, to originate at a sound source with an origin coordinate in the MRE. That is, the user may perceive these audio signals as if they are real audio signals originating from the origin coordinate of the sound source.

In some cases, audio signals may be considered virtual in that they correspond to computational signals in a virtual environment. Virtual audio signals can be presented to a user as real audio signals detectable by the human ear, for example as generated via speakers 2134 and 2136 of wearable head unit 200 in FIG. 2.

A sound source may correspond to a real object and/or a virtual object. For example, a virtual object (e.g., virtual monster 132 of FIG. 1C) can emit an audio signal in a MRE, which is represented in the MRE as a virtual audio signal, and presented to the user as a real audio signal. For instance, virtual monster 132 of FIG. 1C can emit a virtual sound corresponding to the monster's speech (e.g., dialogue) or sound effects. Similarly, a real object (e.g., real object 122A of FIG. 1C) can be made to appear to emit a virtual audio signal in a MRE, which is represented in the MRE as a virtual audio signal, and presented to the user as a real audio signal. For instance, real lamp 122A can emit a virtual sound corresponding to the sound effect of the lamp being switched on or off—even if the lamp is not being switched on or off in the real environment. The virtual sound can correspond to a position and orientation of the sound source (whether real or virtual). For instance, if the virtual sound is presented to the user as a real audio signal (e.g., via speakers 2134 and 2136), the user may perceive the virtual sound as originating from the position of the sound source. Sound sources are referred to herein as "virtual sound sources," even though the underlying object made to apparently emit a sound may itself correspond to a real or virtual object, such as described above.

Some virtual or mixed reality environments suffer from a perception that the environments do not feel real or authentic. One reason for this perception is that audio and visual cues do not always match each other in such environments. For example, if a user is positioned behind a large brick wall in a MRE, the user may expect sounds coming from behind the brick wall to be quieter and more muffled than sounds originating right next to the user. This expectation is based on the user's auditory experiences in the real world, where sounds become quiet and muffled when they pass behind large, dense objects. When the user is presented with an audio signal that purportedly originates from behind the brick wall, but that is presented unmuffled and at full volume, the illusion that the sound originates from behind the brick wall is compromised. The entire virtual experience may feel fake and inauthentic, in part because it does not comport with the user's expectations based on real world interactions. Further, in some cases, an "uncanny valley" problem arises, in which even subtle differences between virtual experiences and real experiences can cause heightened feelings of discomfort. It is desirable to improve the user's experience by presenting, in a MRE, audio signals that appear to realistically interact—even in subtle ways—with objects in the user's environment. The more consistent that such audio signals are with the user's expectations, based on real world experience, the more immersive and engaging the user's experience in the MRE can be.

One way that users perceive and understand the environment around them is through audio cues. In the real world, the real audio signals users hear are affected by where those audio signals originate from and what objects that audio signals interact with. For example, with all other factors equal, a sound that originates a great distance from a user (e.g., a dog barking in the distance) will appear quieter than the same sound originating from a short distance from the user (e.g., the dog barking in the same room as the user). A user can thus identify a location of a dog in the real environment based in part on the perceived volume of its bark. Likewise, with all other factors equal, a sound that travels away from the user (e.g., the voice of a person who is facing away from the user) will appear less clear and more muffled (i.e., low-pass filtered) than the same sound traveling toward the user (e.g., the voice of a person who is facing toward the user). A user can thus identify the orientation of a person in the real environment based on the perceived characteristics of that person's voice.

A user's perception of real audio signals can also be affected by the presence of objects in the environment with which audio signals interact. That is, a user may perceive not only an audio signal generated by a sound source, but also the reflections of that audio signal against nearby objects and the reverberation signature imparted by the surrounding acoustic space. For example, if a person speaks in a small room with close walls, those walls may cause short, natural reverberated signals to result as the person's voice reflects off of the walls. A user may infer from those reverberations that they are in a small room with close walls. Likewise, a large concert hall or cathedral may cause longer reverberations, from which the user may infer that they are in a large, spacious room. Similarly, reverberations of audio signals may take on various sonic characteristics based on the position or orientation of the surfaces against which those signals reflect, or the materials of those surfaces. For example, reverberations against tiled walls will sound different than reverberations against brick, carpet, drywall, or other materials. These reverberation characteristics can be used by the user to understand—acoustically—the size, shape, and material composition of the space they inhabit.

The above examples illustrate how audio cues can inform a user's perception of the environment around them. These cues can act in combination with visual cues: for example, if the user sees a dog in the distance, the user may expect the sound of that dog's bark to be consistent with that distance (and may feel disconcerted or disoriented if it is not, as in some virtual environments). In some examples, such as in low-light environments, or with respect to visually impaired users, visual cues may be limited or unavailable; in such cases, audio cues may take on a particular importance, and may serve as the user's primary means of understanding their environment.

A system architecture may be beneficial to organize, store, recall, and/or manage information needed to present realistic virtual audio. For example, a MR system (e.g., MR system 112, 200) may manage environmental information like what real environment a user may be in, what acoustic properties that real environment may have, and/or where in that real environment the user may be located. A MR system may further manage information regarding objects in the real and/or virtual environment (e.g., objects that may affect the general acoustic properties of a real environment and/or objects that may affect acoustic properties of a virtual sound source interacting with the objects). A MR system may also manage information regarding virtual sound sources. For example, where a virtual sound source is located may be relevant in rendering realistic virtual audio.

In addition to managing a virtual audio system, it may be necessary to manage other systems simultaneously to present a full MR experience. For example, a full MR experience may require a virtual visuals system, which may manage information used to render virtual objects. A full MR experience may require a simultaneous localization and mapping system ("SLAM"), which may construct, update, and/or maintain a three-dimensional model of a user's environment. A MR system (e.g., MR system 112, 200) may manage these systems and more, in addition to a virtual audio system, to present a full MR experience. A virtual audio system architecture may be helpful to manage interactions between these systems to facilitate data transfer, management, storage, and/or security.

In some embodiments, a system (e.g., a virtual audio system) may interact with other, higher-level systems. In some embodiments, a lower-level system (e.g., a virtual audio system) may more closely interact with hardware-level inputs and/or outputs, whereas a higher-level system (e.g., an application) may interface with a lower-level system. A higher-level system may utilize lower-level systems to execute their function (e.g., a game application may rely on a lower-level virtual audio system to render realistic virtual audio). A virtual audio system may benefit from a system architecture designed to manage interactions with higher-level systems while maintaining the integrity of the virtual audio system. For example, multiple higher-level systems (e.g., multiple third-party applications) may interface with a virtual audio system at the same or substantially the same time. In some embodiments, it may be more computationally efficient to maintain a single virtual audio system that can render virtual audio than to have each higher-level system maintain a separate audio system. For instance, in some embodiments, a single digital reverberator may be used to process sound objects from multiple higher-level systems when those objects are intended to be in the same virtual or real acoustical space (e.g., the room the user is in). A well-designed system architecture may also protect the integrity of information that may be used in other applications (e.g., from data corruption and/or tampering).

In some embodiments, it can be advantageous to design a system architecture such that changes can be made in real-time without disrupting service to other systems (e.g., higher-level systems). For example, a virtual audio system may store, maintain, or otherwise manage an audio model that accounts for acoustic properties of a real environment (e.g., a room). If a user changes real environments (e.g., moves to a different room), the audio model may be updated to account for the change in the real environment. If the MR system is currently in use (e.g., a MR system is presenting virtual visuals and/or virtual audio to the user), it may be necessary to update the audio model when a different system (e.g., a higher-level system) is still using the audio model to render virtual audio.

In some embodiments, it can be advantageous to design a system architecture to propagate changes in other systems. For example, some systems may maintain a separate copy of an audio model, or some systems may store a particular repeated sound effect rendered using an audio model maintained by a virtual audio system. It may therefore be advantageous to propagate changes made in a virtual audio system to other systems. For example, if a user changes environments (e.g., moves rooms) and a new audio model may be more accurate, a virtual audio system may modify its audio model and notify any clients (e.g., systems that use and/or rely on the virtual audio system) of changes. In some embodiments, clients may then query virtual audio system and update internal data accordingly.

Figure 5:
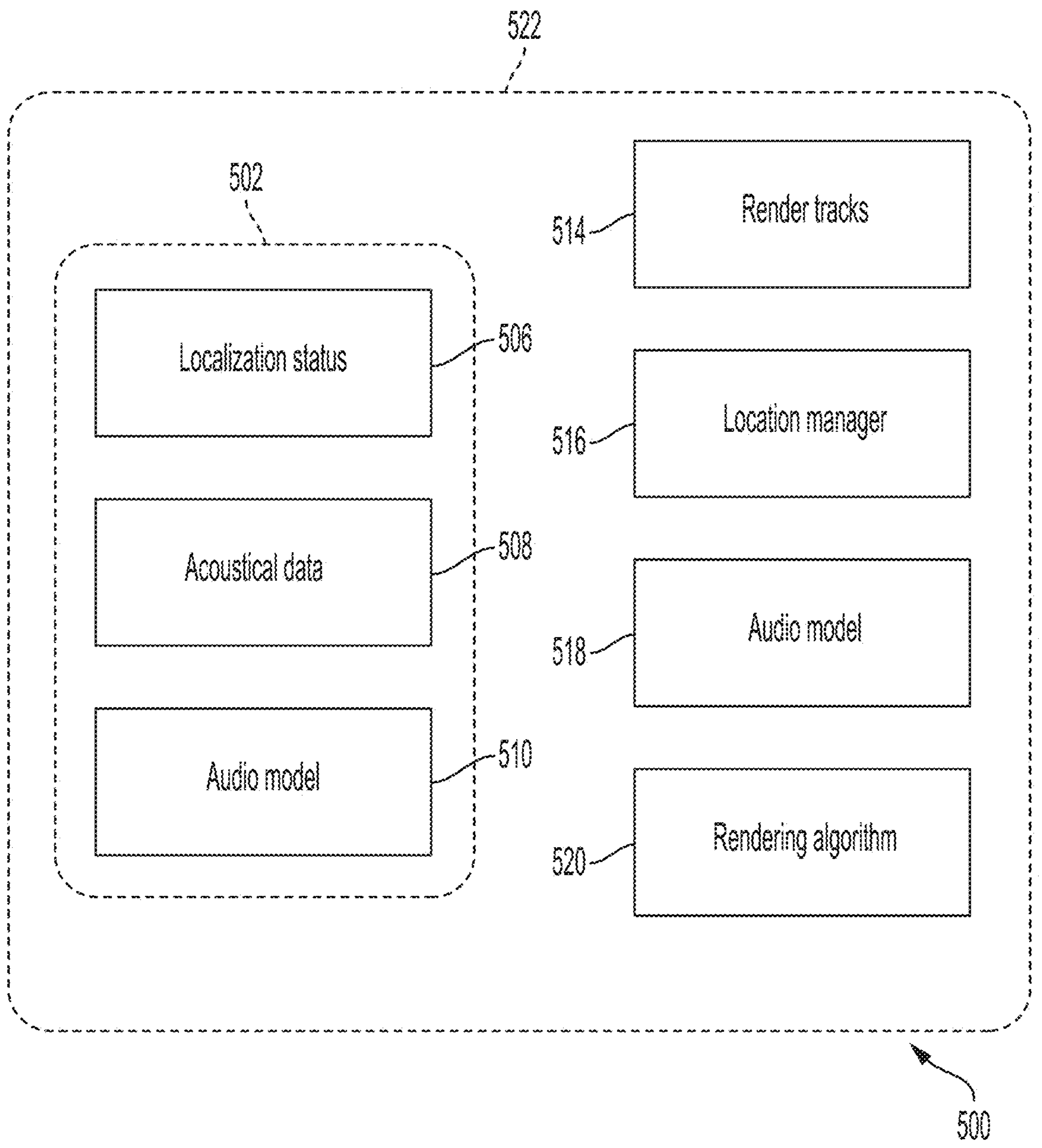
FIG. 5 illustrates an example of a virtual audio system, according to some embodiments

FIG. 5 illustrates an exemplary virtual audio system, according to some embodiments. Virtual audio system 500 can include persistence module 502. A module (e.g., persistence module 502) can include one or more computer systems configured to execute instructions and/or store one or more data structures. In some embodiments, a module (e.g., persistence module 502) can be configured to execute a process, sub-process, thread, and/or service managed by audio service 522 (e.g., instructions executed by persistence module 502 may run within audio service 522), which may run on one or more computer systems. In some embodiments, audio service 522 can be a process, which may run in a run-time environment, and instructions executed by a module (e.g., persistence module 502) may be a component of audio service 522 (e.g., instructions executed by persistence module 502 may be a sub-process of audio service 522). In some embodiments, audio service 522 can be a sub-process of a parent process. Instructions executed by a module (e.g., persistence module 502) can include one or more components (e.g., a process, sub-process, thread, and/or service executed by localization status sub-module 506, acoustical data sub-module 508, and/or audio model sub-module 510). In some embodiments, instructions executed by a module (e.g., persistence module 502) may run as a sub-process of audio service 522 and/or as a separate process in a different location than other components of audio service 522. For example, instructions executed by a module (e.g., persistence module 502) may run in a general-purpose processor, and one or more other components of audio service 522 may run in an audio-specific processor (e.g., a DSP). In some embodiments, instructions executed by a module (e.g., persistence module 502) may run in a different process address space and/or memory space than other components of audio service 522. In some embodiments, instructions executed by a module (e.g., persistence module 502) may run as one or more threads within audio service 522. In some embodiments, instructions executed by a module (e.g., persistence module 502) may be instantiated within audio service 522. In some embodiments, instructions executed by a module (e.g., persistence module 502) may share a process address and/or memory space with other components of audio service 522.

In some embodiments, persistence module 502 can include localization status sub-module 506. Localization status sub-module 506 can include one or more computer systems configured to execute instructions and/or store one or more data structures. For example, instructions executed by localization status sub-module 506 can be a sub-process of persistence module 502. In some embodiments, localization status sub-module 506 can indicate whether localization has been achieved (e.g., localization status sub-module 506 may indicate whether a MR system has identified a real environment and/or located itself within the real environment). In some embodiments, localization status sub-module 506 can interface (e.g., via an API) with a localization system. A localization system may determine a location for a MR system (and/or a user using a MR system). In some embodiments, a localization system can utilize techniques like SLAM to create a three-dimensional model of a real environment and estimate a system's (and/or a user's) location within the environment. In some embodiments, a localization system can rely on a passable world system (described in further detail below) and one or more sensors (e.g., of MR system 112, 200) to estimate a MR system's (and/or a user's) location within an environment. In some embodiments, localization status sub-module 506 can query a localization system to determine if localization is currently achieved for a MR system. Similarly, a localization system may notify localization status sub-module 506 of a successful localization. A localization status (e.g., of a MR system 112, 200) may be used to determine whether an audio model should be updated (e.g., because a user's real environment has changed).

In some embodiments, persistence module 502 can include acoustical data sub-module 508. Acoustical data sub-module 508 can include one or more computer systems configured to execute instructions and/or store one or more data structures. For example, instructions executed by acoustical data sub-module 508 may be a sub-process of persistence module 502. In some embodiments, acoustical data sub-module 508 may store one or more data structures representing acoustical data that may be used to create an audio model. In some embodiments, acoustical data sub-module 508 can interface (e.g., via an API) with a passable world system. A passable world system may include information on known real environments (e.g., rooms, buildings, and/or outside spaces) and associated real and/or virtual objects. In some embodiments, a passable world system may include persistent coordinate frames and/or anchor points. A persistent coordinate frame and/or an anchor point can be a point fixed in space that may be known to a MR system (e.g., by a unique identifier). Virtual objects may be positioned in relation to one or more persistent coordinate frames and/or anchor points to enable object persistence (e.g., a virtual object can appear to remain in the same location in a real environment regardless of who is viewing the virtual object and regardless of any movement of a user). Persistent coordinate frames and/or anchor points can be especially advantageous when two or more users with separate MR systems utilize different world coordinate frames (e.g., each user's location is designated as an origin for their respective world coordinate frame). Object persistence across users can be achieved by translating between an individual world coordinate frame and a universal persistent coordinate frame and placing/referencing virtual objects in relation to a persistent coordinate frame. In some embodiments, a passable world system can manage and maintain persistent coordinate frames by, for example, mapping new areas and creating new persistent coordinate frames; by re-mapping known areas and reconciling new persistent coordinate frames with previously determined persistent coordinate frames; and/or associating persistent coordinate frames with identifiable information (e.g., a location and/or nearby objects). In some embodiments, acoustical data sub-module 508 may query a separate system (e.g., a passable world system) for one or more persistent coordinate frames. In some embodiments, acoustical data sub-module 508 can retrieve relevant persistent coordinate frames (e.g., persistent coordinate frames within a threshold radius of a user's position) to facilitate access and management, including creation, modification, and/or deletion of associated acoustical data.

In some embodiments, acoustical data stored in acoustical data sub-module 508 can be organized into physically-correlated modular units (e.g., a room may be represented by a modular unit, and a chair within the room may be represented by another modular unit). For example, a modular unit may include physical and/or perceptually relevant properties of a physical environment (e.g., a room). Physical and/or perceptually relevant properties can include properties that may affect a room's acoustic characteristics (e.g., dimensions and/or a shape of the room). In some embodiments, physical and/or perceptually relevant properties can include functional and/or behavioral properties, which may be interpreted by a rendering engine (e.g., whether sources outside of the room should be occluded or not). In some embodiments, physical and/or perceptually relevant properties can include properties of known and/or recognized objects. For example, geometry of fixed (e.g., a floor, a wall, furniture, etc.) and/or movable (e.g., a mug) objects may be stored as physical and/or perceptually relevant properties and may be associated with a particular environment. In some embodiments, physical and/or perceptually relevant properties can include transmission loss, scattering coefficients, and/or absorption coefficients. In some embodiments, a modular unit can include physical and/or perceptually relevant linkages (e.g., between other modular units or within a modular unit). For example, a physical and/or perceptually relevant linkage may link together two or more rooms and describe how the rooms may interact with each other (e.g., cross-coupling gain levels between the digital reverberators simulating the rooms and/or line of sight paths between the two spaces).

In some embodiments, physical and/or perceptually relevant properties can include acoustic properties like a reverberation time, reverberation delay, and/or reverberation gain. A reverberation time may include a length of time required for a sound to decay by a certain amount (e.g., by 60 decibels). Sound decay can be a result of sound reflecting off surfaces in a real environment (e.g., walls, floors, furniture, etc.) whilst losing energy due to, for example, sound absorption by a room's boundaries (e.g., walls, floors, ceiling, etc.), objects inside the room (e.g., chairs, furniture, people, etc.), and the air in the room. A reverberation time can be influenced by environmental factors. For example, absorbent surfaces (e.g., cushions) may absorb sound in addition to geometric spreading, and a reverberation time may be reduced as a result. In some embodiments, it may not be necessary to have information about an original source to estimate an environment's reverberation time. A reverberation gain can include a ratio of a sound's direct/source/original energy to the sound's reverberation energy (e.g., energy of a reverberation resulting from the direct/source/original sound) where a listener and the source are substantially co-located (e.g., a user may clap their hands, producing a source sound that may be considered substantially co-located with one or more microphones mounted on a head-wearable MR system). For example, an impulse (e.g., a clap) may have an energy associated with the impulse, and the reverberation sound from the impulse may have an energy associated with the reverberation of the impulse. The ratio of the original/source energy to the reverberation energy may be a reverberation gain. A real environment's reverberation gain may be influenced by, for example, absorbent surfaces that can absorb sound and thereby reduce a reverberation energy.

In some embodiments, acoustical data can include metadata (e.g., metadata of physical and/or perceptually relevant properties). For example, information about when and/or where acoustical data was gathered may be included in acoustical data. In some embodiments, confidence data (e.g., an estimated measurement accuracy and/or a count of repeated measurements) associated with acoustical data may be included as metadata. In some embodiments, a type of modular unit (e.g., a modular unit for a room or a linkage between modular units) and/or data versioning may be included as metadata. In some embodiments, a unique identifier associated with acoustical data, persistent coordinate frame, and/or an anchor point may be included as metadata. In some embodiments, a relative transform from a persistent coordinate frame and/or an anchor point and an associated virtual object may be included as metadata. In some embodiments, metadata can be stored with acoustical data as a single bundle.

In some embodiments, acoustical data may be organized by persistent coordinate frames and/or anchor points, and persistent coordinate frames and/or anchor points may be organized into maps. In some embodiments, an audio model may account for acoustic data organized by persistent coordinate frames and/or anchor points, which may correspond to locations within an environment. In some embodiments, acoustical data may be loaded into acoustical data sub-module 508 upon a successful localization event (which may be indicated by localization status sub-module 506). In some embodiments, all available acoustical data may be loaded into acoustical data sub-module 508. In some embodiments, only relevant acoustical data may be loaded into acoustical data sub-module 508 (e.g., acoustical data for persistent coordinate frames and/or anchor points within a certain distance of a MR system's location).

In some embodiments, acoustical data can include different states that may change according to changes in a real environment. For example, acoustical data for a given modular unit which may represent a room may include acoustical data for the room in an empty state and acoustical data for the room in an occupied state. In some embodiments, changes in a room's furniture arrangement may be reflected by a change of state in acoustical data associated with the room. In some embodiments, a modular unit (e.g., representing a room) may include different acoustical data for states when a door is open or closed. States can be represented as binary values (e.g., 0 or 1) or continuous values (e.g., how open a door is, how occupied a room is, etc.).

In some embodiments, persistence module 502 may include audio model sub-module 510. Audio model sub-module 510 can include one or more computer systems configured to execute instructions and/or store one or more data structures. For example, audio model sub-module 510 may include one or more data structures representing an audio model for a real and/or virtual environment. In some embodiments, the audio model may be generated at least in part by acoustical data stored in acoustical data sub-module 508. An audio model may represent how sounds behave in a particular environment. For example, virtual sounds generated by a MR system (e.g., MR system 112, 200) may be modified by an audio model in audio model sub-module 510 to reflect acoustic characteristics of an environment. A virtual concert presented to a user sitting in a cavernous concert hall may have similar acoustic properties as a real concert presented in the same concert hall. A MR system may localize itself to an identified concert hall, load relevant acoustical data, and generate an audio model to model acoustical properties of the concert hall.

In some embodiments, an audio model may be used to model sound propagation in an environment. For example, propagation effects can include occlusion, obstruction, early reflections, diffraction, time-of-flight delay, Doppler effects, and other effects. In some embodiments, an audio model can account for frequency-dependent absorption and/or transmission loss (e.g., based on acoustical data loaded into acoustical data sub-module 508). In some embodiments, an audio model stored in audio model sub-module 510 may inform other aspects of an audio engine. For example, an audio model may use acoustical data to procedurally synthesize audio (e.g., collisions between virtual and/or real objects).

In some embodiments, audio render service 522 may include render track module 514. Render track module 514 can include one or more computer systems configured to execute instructions and/or store one or more data structures. For example, render track module 514 may include audio information that may later be presented to a user. In some embodiments, a MR system may present a virtual sound that includes several sound sources mixed together (e.g., a sound source of two swords colliding and a sound source of a person yelling). Render track module 514 may store one or more tracks that may be mixed with other tracks to present to a user. In some embodiments, render track module 514 can include information about spatial sources. For example, render track module 514 may include information about where a sound source is located, which may be accounted for in an audio model and/or rendering algorithm. In some embodiments, render track module 514 may include information about relationships between modular units and/or sound sources. For example, one or more render tracks and/or audio models may be associated together as a single group.

In some embodiments, audio render service 522 may include a location manager module 516. Location manager module 516 can include one or more computer systems configured to execute instructions and/or store one or more data structures. For example, location manager module 516 may manage location information relevant to an audio engine (e.g., a current location of a MR system in a real environment). In some embodiments, location manager module 516 can include a perception wrapper sub-module. A perception wrapper sub-module may be a wrapper around perception data (e.g., what a MR system has detected or is detecting). In some embodiments, the perception wrapper may interface and/or translate between perception data and location manager module 516. In some embodiments, location manager module 516 may include a head-pose sub-module, which may include head-pose data. Head-pose data may include a location and/or orientation of a MR system (or a corresponding user) in a real environment. In some embodiments, the head-pose may be determined based on the perception data.

In some embodiments, audio render service 522 may include audio model module 518. Audio model module 518 can include one or more computer systems configured to execute instructions and/or store one or more data structures. For example, audio model module 518 may include an audio model, which may be the same audio model included in audio model sub-module 510. In some embodiments, modules 510 and 518 may maintain duplicate copies of the same audio model. It can be advantageous to maintain more than one copy of an audio model when, for example, an audio model is being updated, but a sound should be presented to a user. It can be advantageous to update a copy of a model when the model is currently in use, and then update the outdated model when the outdated model becomes available (e.g., is no longer in use). In some embodiments, an audio model can be transferred between modules 510 and 518 through serialization. The audio model in module 510 can be serialized and de-serialized to facilitate data transfer to module 518. Serialization can facilitate data transfer between processors (e.g., a general processor and an audio-specific processor) so that typed memory does not need to be shared.

In some embodiments, audio render service 522 can include rendering algorithm module 520. Rendering algorithm module 520 can include one or more computer systems configured to execute instructions and/or store one or more data structures. For example, rendering algorithm module 520 can include an algorithm to render virtual sounds so that they can be presented to a user (e.g., via one or more speakers of a MR system). Rendering algorithm module 520 may account for an audio model of a specific environment (e.g., an audio model in module 510 and/or 518).

In some embodiments, audio service 522 can be a process, sub-process, thread, and/or service running on one or more computer systems (e.g., in MR system 112, 200). In some embodiments, a separate system (e.g., a third-party application) may request that an audio signal be presented (e.g., via one or more speakers of MR system 112, 200). Such a request may take any suitable form. In some embodiments, a request that an audio signal be presented can include a software instruction to present the audio signal; in some embodiments, such a request may be hardware-driven. Requests may be issued with or without user involvement. Further, such requests may be received via local hardware (e.g., from the MR system itself), via external hardware (e.g., a separate computer system in communication with the MR system), via the internet (e.g., via a cloud server), or via any other suitable source or combination of sources. In some embodiments, audio service 522 may receive the request, render a requested audio signal (e.g., through rendering algorithm 520, which may account for an audio model from block 510 and/or 518), and present the requested audio signal to a user. In some embodiments, audio service 522 may be a process that continually runs (e.g., in the background) while an operating system of a MR system is running. In some embodiments, audio service 522 can be an instantiation of a parent background service, which may serve as a host process to one or more background processes and/or sub-processes. In some embodiments, audio service 522 may be part of an operating system of a MR system. In some embodiments, audio service 522 may be accessible to applications that may run on the MR system. In some embodiments, a user of a MR system may not directly provide inputs to audio service 522. For example, a user may provide an input (e.g., a movement command) to an application (e.g., a role-playing game) running on a MR system. The application may provide inputs to audio service 522 (e.g., to render the sound of footsteps), and audio service 522 may provide outputs (e.g., the rendered sound of footsteps) to the user (e.g., via a speaker) and/or to other processes and/or services.

Figure 6:
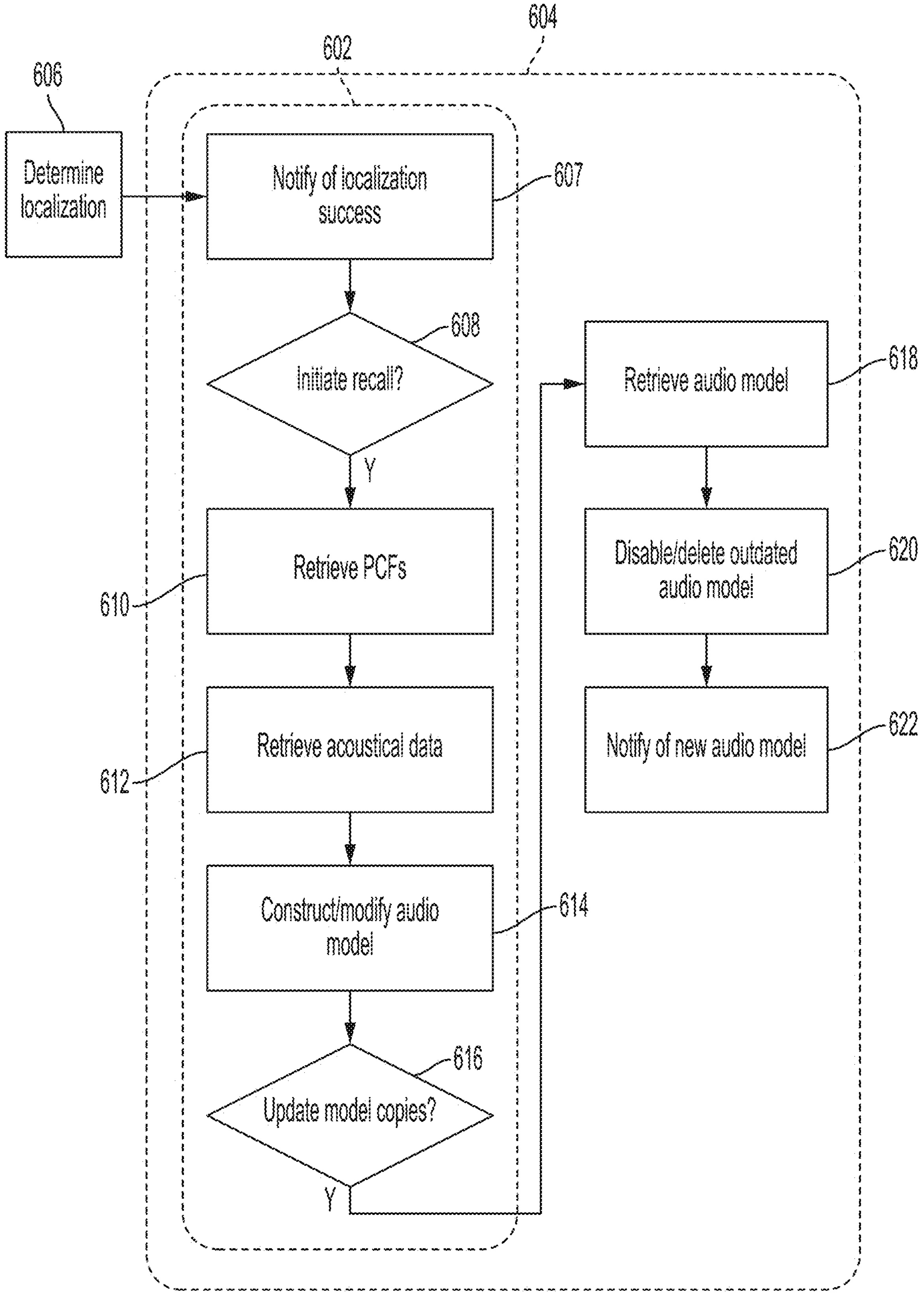
FIG. 6 illustrates an example process for updating an audio model, according to some embodiments.

FIG. 6 illustrates an exemplary process for updating an audio model, according to some embodiments. At step 606, a localization may be determined (e.g., a MR system may successfully identify its location within an environment). At step 607, which may occur within a persistence module 602 (which may correspond with persistence module 502), a notification of a successful localization may issue. In some embodiments, a notification of a successful localization may trigger a process to update an audio model (e.g., because the previous audio model may no longer apply to the current location).

At step 608, it can be determined whether to initiate a recall of acoustical data. It can be desirable to set one or more conditions for initiating recall so that an audio model is not updated too often. For example, if a user using a MR system moves only slightly within a room, it may not be desirable to update an audio model (e.g., because an updated model may not be perceptually distinguishable from the existing model, and/or it may be computationally expensive to continually update the model). In some embodiments, a threshold condition at step 608 may be based on time. For example, a recall may be initiated only if a recall has not already been initiated in the previous 5 seconds. In some embodiments, a threshold condition at step 608 may be based on localization. For example a recall may only be initiated if a user has changed positions by a threshold amount of distance. It should be noted that other threshold conditions may be used as well. In some embodiments, steps 607 and/or 608 may occur within a localization status sub-module (e.g., localization status sub-module 506).

If it is determined that a recall should be initiated, persistent coordinate frames may be retrieved at step 610. In some embodiments, only a subset of available persistent coordinate frames may be retrieved at step 610. For example, only persistent coordinate frames near a localization may be retrieved.

At step 612, acoustical data may be retrieved. In some embodiments, the acoustical data retrieved at step 612 may correspond with acoustical data stored in acoustical data sub-module 508. In some embodiments, only a subset of available acoustical data may be retrieved at step 612. For example, acoustical data associated with one or more persistent coordinate frames and/or anchor points may be retrieved. In some embodiments, steps 612 and/or 614 may occur within an acoustical data sub-module (e.g., acoustical data sub-module 508).

At step 614, an audio model may be constructed and/or modified. In some embodiments, the audio model may account for acoustical data retrieved at step 612, and the audio model may model acoustic characteristics of a particular environment. In some embodiments, step 614 may occur within an audio model sub-module (e.g., audio model sub-module 510).

At step 616, it can be determined if copies of the audio model should be updated. It may be desirable to set one or more conditions for updating copies of the audio model to avoid disrupting services (e.g., presenting audio to a user). For example, one condition may evaluate whether copies of the audio model exist (e.g., within audio render service 604 but outside of persistence module 602). If no copies of the audio model exist, the audio model may be retrieved by audio render service 604 (which may correspond to audio render service 522). In some embodiments, a condition may evaluate whether a copy of an audio model is currently in use (e.g., whether the audio model is being used to render audio to present to a user). If the copy of the audio model is not in use, the updated audio model (e.g., the audio model generated at step 614) may be propagated to the copy.

At step 618, audio render service 604 may retrieve a copy of an audio model (e.g., an audio model generated at step 614). The audio model may be transferred using data serialization and/or de-serialization.

At step 620, an outdated audio model may be optionally deleted and/or disabled. For example, audio render service 604 may have a first, existing audio model which it has previously been using. The audio render service 604 may retrieve a second, updated audio model (e.g., from persistence module 602) and delete and/or disable the first, existing audio model.

At step 622, a notification may be issued of a new audio model. In some embodiments, a notification may include a callback function to clients (e.g., third-party applications) who may be subscribed to hear when the audio model changes.

Figure 7:
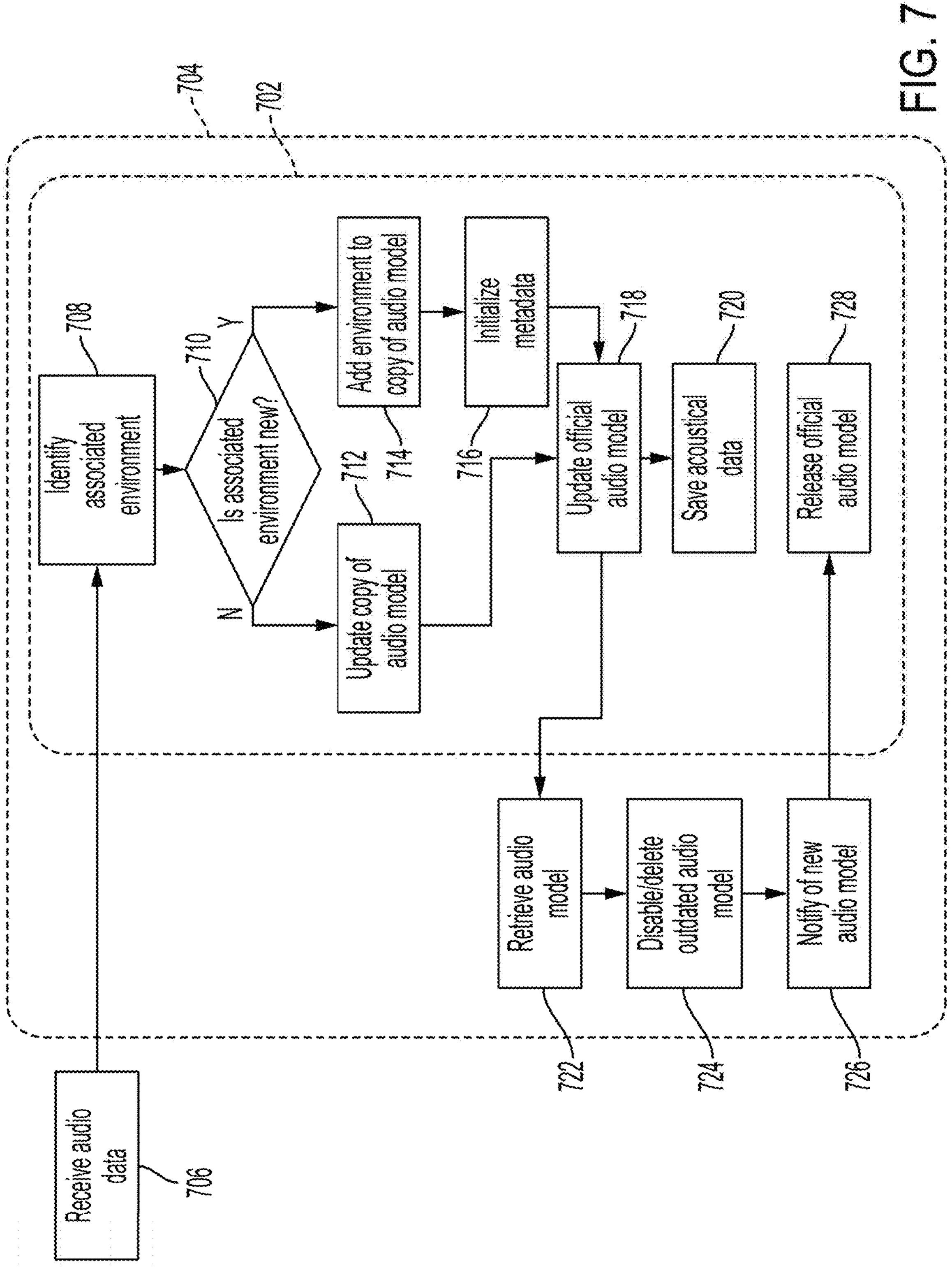
FIG. 7 illustrates an example process for updating an audio model, according to some embodiments.

FIG. 7 illustrates an exemplary process for updating an audio model, according to some embodiments. At step 706, audio data may be received (e.g., via one or more sensors of MR system 112, 200). In some embodiments, audio data may be manually entered (e.g., a user and/or a developer may manually enter a reverberation time, reverberation delay, reverberation gain, etc.). At step 708, which may occur in persistence module 702 (which may correspond with persistence module 502), an associated environment may be identified. An associated environment may be identified by metadata that may accompany the audio data (e.g., the metadata may carry information about one or more persistent coordinate frames and/or anchor points which may be known to a MR system).

At step 710, it can be determined if the associated environment is new. For example, if an associated environment may not be identified and/or is associated with unknown identifiers, it may be determined that the audio data is associated with a new environment. If it is determined that an associated environment is not new, a copy of the official audio model may be updated (e.g., with room properties that may be derived from the audio data). If it is determined that the associated environment is new, a new environment may be added to a copy of the official audio model and the copy audio model may be updated accordingly. In some embodiments, the new environment may be represented by a new modular unit.

At step 716, metadata associated with the new environment (e.g., metadata associated with the new modular unit) may be initialized. For example, metadata associated with a measurement count, confidence, or other information may be created and bundled with the new modular unit.

At step 718, the official audio model within persistence module 702 may be updated. For example, the official audio model may be duplicated from an updated copy audio model. In some embodiments, the official audio model may be locked at step 718 to prevent further changes being made to the official audio model. In some embodiments, changes may still be made to copies of the official audio model (that may still exist within persistence module 702) while the official audio model is locked.

At step 720, acoustical data associated with the new audio data may be saved. For example, a new modular unit associated with a new room may be saved and/or passed to a passable world system (which may make it accessible in the future to MR systems as needed). In some embodiments, step 720 may occur within acoustical data sub-module 508. In some embodiments, step 720 may occur sequentially following step 718. In some embodiments, step 720 may occur at an independent time as determined by other components, for example, based on the availability of a passable world system in which acoustical data may be saved.

At step 722, audio render service 704 (which may correspond to audio render service 522) may retrieve a copy of an audio model. In some embodiments, the copy of the audio model may be the same audio model updated at step 718. In some embodiments, the data transfer can occur through serialization and de-serialization. In some embodiments, an audio model may be locked while a serialization process is executed, which may prevent the audio model from changing while a snapshot of the audio model is created.

At step 724, an outdated copy of an audio model may be deleted and/or disabled.

At step 726, a notification may be issued regarding the new audio model. The notification can be a callback function to clients subscribed to hear when the model is updated.

At step 728, the official audio model may be released, which may indicate that a serialized bundle corresponding to the audio model may be deleted. In some embodiments, it may be desirable to lock the official audio model within persistence module 702 while a copy of the official audio model is being transferred to audio render service 704. It may be desirable to release the lock of the official audio model once audio render service 704 has finished retrieving a copy of the official audio model so that the official audio model can continue to update.

In some embodiments, audio render service (e.g., audio render service 522) may not manage interactions between a persistence module (e.g., persistence module 502) and a rendering algorithm (e.g., rendering algorithm module 520). For example, rendering algorithm 520 may communicate directly with persistence module 502 to retrieve an updated audio model. In some embodiments, rendering algorithm 520 may include its own copy of the audio model. In some embodiments, rendering algorithm 520 may access an audio model within persistence module 502.

Multi-Application Audio Rendering

MR systems (e.g., MR system 112, 200) can leverage a variety of onboard sensors to develop a customized audio model for a user's MRE. A MR system may account for real features in a user's MRE (e.g., a floor, walls, people) as well as virtual objects in a user's MRE (e.g., a virtual couch) to generate a customized audio model that may properly reflect the real and/or virtual physics of a user's MRE. For example, a virtual sound source may be located in the user's MRE. An audio model may identify a direct path from the virtual sound source to the user to determine if the virtual sound should be occluded by either a real or a virtual object in the direct path. In some embodiments, an audio model may determine how sound from a virtual sound source may reflect off real and/or virtual objects in the user's MRE (e.g., hard surfaces may reflect more sound, certain surfaces may reflect more high frequency sound, a rough surface may scatter sound in multiple directions, etc.). In some embodiments, an audio model may determine how a sound from a virtual sound source may reverberate in the user's MRE. In some embodiments, it can be desirable to allow customizations to a model that may be "accurate" to the real and/or virtual physics of a user's MRE. For example, a MR application may begin with a user in their current physical space and slowly transform the user's environment into an exotic environment. As the MR application transforms the user's environment (e.g., by adding virtual trees, virtual foliage, etc.) the MR application may adapt an "official" audio model (e.g., by removing physical walls and a ceiling from the official audio model) to suit the desired user experience.

Problems may arise, however, when more than one MR application is running concurrently on a MR system. In some embodiments, each application may wish to use a different audio model to present sounds to the user. For example, a MR system may concurrently run a web browsing application and a podcast application. In some embodiments, the web browser may be playing an informational video, and the web browser may use an official audio model generated by the MR system. Because the web browser may use the official audio model, the informational video may sound as if a speaker was situated in the user's MRE (e.g., the speaker's voice may properly be occluded, reflect, and reverberate based on real and/or virtual objects in the user's MRE). In some embodiments, the podcast application may be playing a podcast situated in a cave. Accordingly, it may be desirable for the podcast application to present sound as highly reflective and/or reverberant.

However, conflicts may arise if a web browsing application and a podcast application simultaneously attempt to present audio using different audio models. In some embodiments, a soundtrack from each application may be rendered separately using separate audio models and later mixed together to present sound to the user (e.g., an audio signal comprising one or more rendered sounds). However, fully separate rendering pipelines may be computationally expensive, and in some cases may double the computational resources needed to render a soundtrack from a single application. Computational resources can become even more strained as more applications are run concurrently, and it may not be computationally feasible to render soundtracks from, for example, ten different concurrently running applications utilizing separate customized audio models. It can therefore be desirable to design systems and methods to accommodate concurrently running MR applications that may utilize different audio models.

Figure 8:
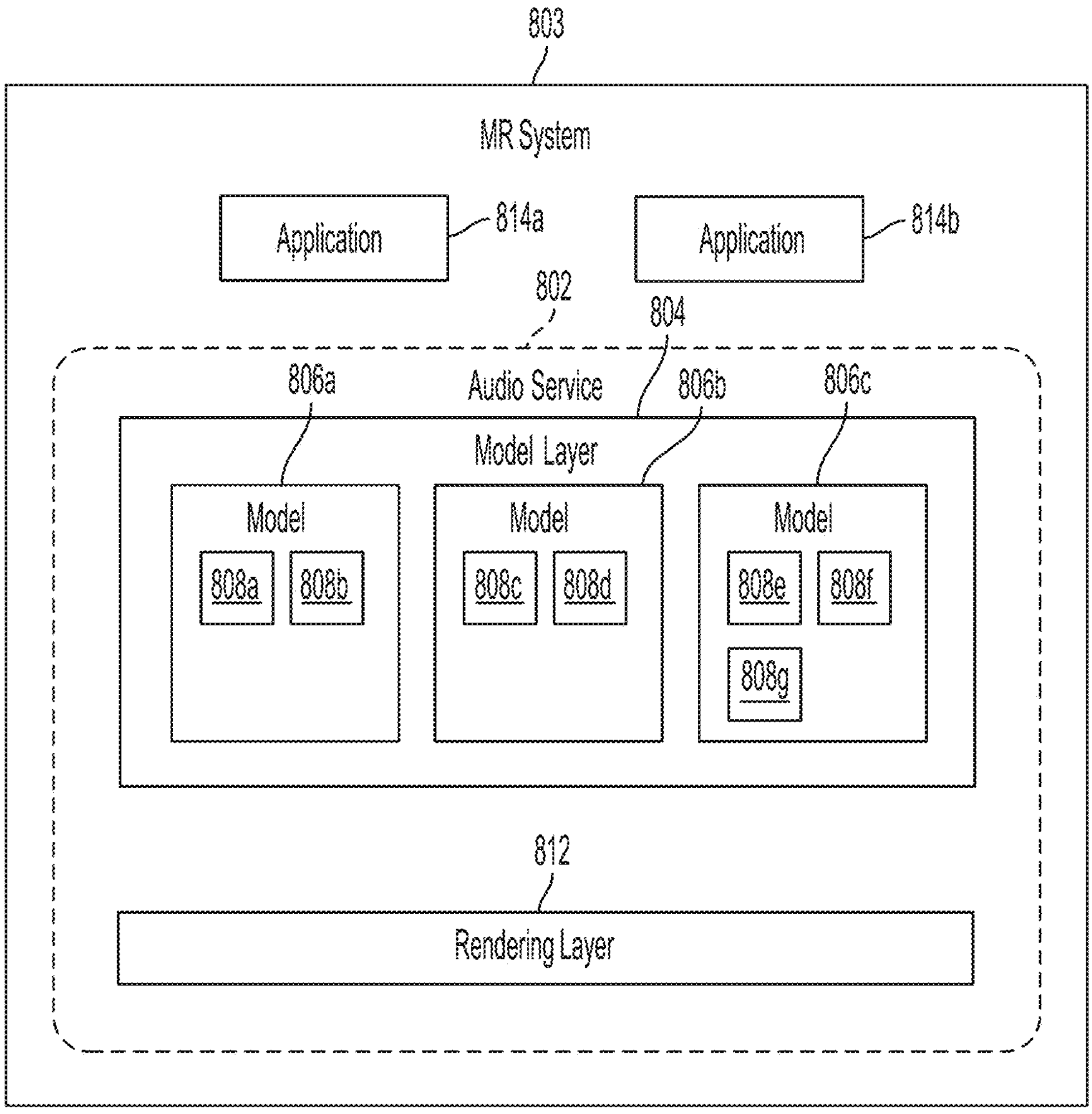
FIG. 8 illustrates an exemplary model management architecture, according to some embodiments.

FIG. 8 illustrates a model management architecture, according to some embodiments. In some embodiments, MR system 803 (which may correspond to MR system 112, 200) can include one or more computer systems configured to execute instructions. MR system 803 can include audio service module 802 (which may correspond to audio service 522). Audio service module 802 may manage audio rendering and can include one or more computer systems configured to execute one or more processes, sub-processes, threads, and/or services. In some embodiments, audio service module 802 can be configured to execute a service (e.g., a background service) as part of an operating system of one or more computer systems.

In some embodiments, a separate system (e.g., a third-party application) may request that an audio signal be presented (e.g., via one or more speakers of MR system 112, 200). Such a request may take any suitable form. In some embodiments, a request that an audio signal be presented can include one or more software instructions to present the audio signal; in some embodiments, such a request may be hardware-driven. Requests may be issued with or without user involvement. Further, such requests may be received via local hardware (e.g., the MR system itself), via external hardware (e.g., a separate computer system in communication with the MR system), via the internet (e.g., via a cloud server), or via any other suitable source or combination of sources. In some embodiments, audio service 802 may receive the request, render a requested audio signal (e.g., through one or more rendering algorithms, which may utilize an audio model managed by model layer 804), and present the requested audio signal to a user. In some embodiments, audio service 802 may be configured to execute a process that continually runs (e.g., in the background) while an operating system of a MR system is running. In some embodiments, audio service 802 can be configured to execute an instantiation of a parent background service, which may serve as a host process to one or more background processes and/or sub-processes. In some embodiments, audio service 802 may be configured to execute instructions as part of an operating system of a MR system. In some embodiments, audio service 802 may be accessible to applications that may run on the MR system. In some embodiments, a user of a MR system may not directly provide inputs to audio service 802. For example, a user may provide an input (e.g., a movement command) to an application (e.g., a role-playing game) running on a MR system. The application may provide inputs to audio service 802 (e.g., to render the sound of footsteps), and audio service 802 may provide outputs (e.g., an audio signal comprising the rendered sound of footsteps) to the user (e.g., via a speaker) and/or to other processes and/or services.

In some embodiments, audio service 802 can include model layer 804, which may be configured to manage one or more audio models. In some embodiments, model layer 804 can include one or more computer systems configured to execute one or more processes, sub-processes, threads, and/or services. In some embodiments, model layer 804 can include one or more computer systems configured to store information. For example, model layer 804 may store one or more audio models 806*a*, 806*b*, and/or 806*c*. In some embodiments, an audio model can include one or more abstract representations of data used to render audio. In some embodiments, an audio model can include one or more data structures configured to store information. In some embodiments, an audio model (e.g., audio model 806*a*) can include one or more audio model components (e.g., component 808*a* and 808*b*). In some embodiments, an audio model component can include one or more data structures configured to store information.

In some embodiments, an audio model component can store one or more abstract representations of data used to render audio. For example, an audio model component can include data on one or more real and/or virtual objects. In some embodiments, an audio model component can include position data on one or more real and/or virtual objects. In some embodiments, an audio model component can include material data (e.g., audio reflectivity, transmissivity, absorption, scattering, diffraction, etc.) on one or more real and/or virtual objects. In some embodiments, one audio model component can represent one real and/or virtual object and its associated properties.

In some embodiments, an audio model can include data on one or more virtual sound sources. For example, an audio model can include position data on one or more virtual sound sources. In some embodiments, one audio model component can represent one virtual sound source and its associated properties.

In some embodiments, an audio model can include audio parameter data (e.g., sound radiation properties, volume, etc.) on one or more virtual sound sources. In some embodiments, an audio model can include one or more audio parameters of an environment. For example, an audio model may include dimensions of an environment (e.g., a room that a user is occupying). In some embodiments, an audio model may include a reverberation time and/or a reverberation gain of an environment. In some embodiments, one audio model component can represent one audio parameter of an environment.

In some embodiments, model layer 804 can be configured to manage different audio models. For example, model 806*a* may be considered an official model (e.g., model 806*a* may be configured to represent realistic physical interaction between virtual sounds and real and/or virtual objects in a user's environment). In some embodiments, model 806*a* can include model component 808*a* representing a virtual wall (which may reside in a user's environment). In some embodiments, model 806*a* can include model component 808*b* representing a reverberation time (e.g., of the user's environment). In some embodiments, model 806*a* may be used by application 814*a*, which can be configured to run on MR system 803. In some embodiments, application 814*a* can be a MR application that has requested virtual audio to be presented to a user. In some embodiments, an association between application 814*a* and model 806*a* can be stored in model layer 804 (e.g., via metadata associated with model 806*a*). In some embodiments, application 814*a* can store data (e.g., a model identifier), and application 814*a* may specify that a particular audio model be used using the data.

In some embodiments, model layer 804 can be configured to manage model 806*b*. In some embodiments, model 806*b* may differ from model 806*a*. For example, model 806*b* may include model component 808*c* which may correspond to and/or be the same as model component 808*a* (e.g., both model components 808*a* and 808*c* may represent the same virtual wall). However, model 806*b* may include model component 808*d*, which may not correspond to and/or be the same as model component 808*b*. For example, model component 806*d* may represent a second reverberation time, which may be a longer reverberation time than one corresponding to model component 806*b*.

In some embodiments, model 806*b* can be a full audio model. For example, model 806*b* may be used to render audio without dependencies on other models (e.g., model 806*a*). In some embodiments, model 806*b* can include one or more dependencies on other models. For example, model 806*b* may include one or more pointers to model component 808*a* in model 806*a* (e.g., because model component 808*c* corresponds to model component 808*a*). In some embodiments, storing an audio model with dependencies can be less demanding on memory and/or storage than storing fully independent audio models.

In some embodiments, model 806*c* may share no components with models 806*a* and/or 806*b*. For example, model component 808*e* can represent a virtual sofa, model component 808*f* can represent a virtual whiteboard, and model component 808*g* can represent a third reverberation time, which may be shorter than the second and first reverberation times associated with model components 808*b* and 808*d*, respectively. In some embodiments, model 806*c* may be associated with application 814*b*, which may be configured to run on MR system 803.

Although FIG. 8 depicts model layer 804 as managing one or more audio models as part of audio service 802, other embodiments are contemplated as well. In some embodiments, each application may manage its own one or more audio models. For example, application 814*a* may store model 806*a* locally within application 814*a*. In some embodiments, model 806*a* can be an official model, and application 814*a* may store a reference to model 806*a* in model layer 804. In some embodiments, application 814*b* may store model 806*c* locally, and model 806*c* may not be stored in model layer 804. In some embodiments, model layer 804 may generate an audio model. For example, a user of an MR system may change physical environments, and a new audio model may more accurately represent acoustic characteristics of the new environment. In some embodiments, an application (e.g., application 814*a*) may request that a new audio model be generated because the application may utilize one or more customizations and/or because the application may utilize a fully custom audio model.

In some embodiments, model layer 804 may store audio models that are associated with applications that are currently running on MR system 803. For example, MR system 803 may only currently be running applications 814*a* and 814*b*, and model 806*b* may not be associated with applications 814*a* or 814*b*. In some embodiments, model 806*b* may be removed from model layer 804 (e.g., to save memory). In some embodiments, an official model may be continually stored in model layer 804. In some embodiments, model layer 804 may remove an audio model from memory if it has not been used for a threshold amount of time. In some embodiments, an application may request that model layer 804 retain an audio model in memory.

In some embodiments, audio service 802 can include rendering layer 812, which may be configured to manage one or more audio models. In some embodiments, rendering layer 812 (which can correspond to rendering algorithm module 520) can include one or more computer systems configured to execute one or more processes, sub-processes, threads, and/or services. Rendering layer 812 may render audio from one or more inputs (e.g., model components, sound source information, etc.). In some embodiments, rendering layer 812 may render a stream of audio information, and the audio stream may be rendered in real time. In some embodiments, rendering layer 812 may render audio from a fixed amount of input data. Rendered audio may be presented to a user as one or more audio signals that comprise the rendered audio. Audio signals can be presented via one or more speakers of a device (e.g., speakers 412 and 414 shown in FIG. 4).

Although FIG. 8 depicts three models with varying numbers of model components, it is contemplated that any number of models may be managed by audio service 802. It is also contemplated that any model may include any number of model components.

Figure 9A:
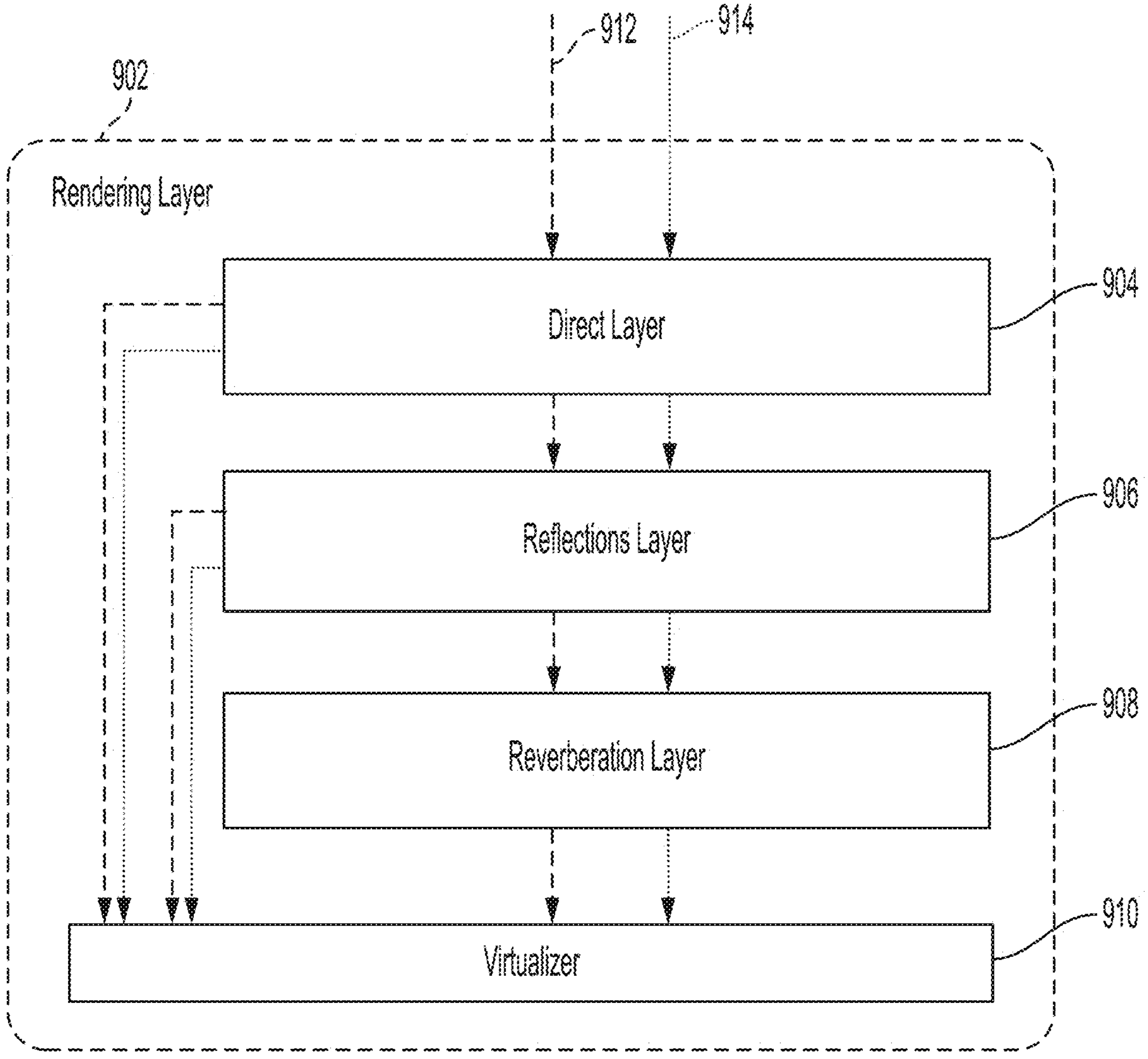
FIGS. 9A-9B illustrate an exemplary rendering architecture, according to some embodiments.

FIG. 9A illustrates a rendering architecture, according to some embodiments. In some embodiments, rendering layer 902 (which can correspond to rendering layer 812) can include one or more computer systems configured to execute one or more processes, sub-processes, threads, and/or services. In some embodiments, rendering layer 902 can be configured to render audio from one or more inputs (e.g., model components, sound source information, etc.). In some embodiments, rendering layer 902 may render a stream of audio information, and the audio stream may be rendered in real time. In some embodiments, rendering layer 902 may render audio from a fixed amount of input data.

Rendering layer 902 may include direct layer 904. In some embodiments, direct layer 904 can include one or more computer systems configured to execute processes, sub-processes, threads, and/or services. In some embodiments, direct layer 904 can be configured to render a direct path between a sound source and a listening node (e.g., a user). Direct layer 904 may determine if a sound should be occluded (e.g., because a real and/or virtual object obstructs a direct path from a sound source to a listening node). In some embodiments, direct layer 904 may determine if a sound should be attenuated (e.g., because of a distance between the sound source and a listening node).

Rendering layer 902 may include reflections layer 906. In some embodiments, reflections layer 906 can include one or more computer systems configured to execute processes, sub-processes, threads, and/or services. In some embodiments reflections layer 906 can be configured to render one or more reflected audio paths between a sound source and a listening node (e.g., a user). For example, sound from a sound source may reflect off a wall before reaching a listening node, and reflections layer 906 may render one or more effects of the reflection (e.g., a reflected sound may be delayed compared to a direct sound, and a reflected may be attenuated compared to a direct sound). In some embodiments, a reflections layer 906 can be configured to apply one or more filters to audio to approximate behavior of reflected sounds in a generic environment. In some embodiments, a reflections layer 906 can be configured for audio raytracing, which may calculate a reflection path for one or more audio rays.

Rendering layer 902 may include reverberations layer 908. In some embodiments, reverberations layer 908 may include one or more computer systems configured to execute processes, sub-processes, threads, and/or services. In some embodiments, reverberations layer 908 can be configured to render reverberant behavior (e.g., late reverberant behavior) of audio. In some embodiments, late reverberant behavior may be affected and/or determined by environmental properties, such as an environment's reverberation time and/or reverberation gain.

Rendering layer 902 may include virtualizer 910. In some embodiments, virtualizer 910 may include one or more computer systems configured to execute processes, sub-processes, threads, and/or services. In some embodiments, virtualizer 910 can be configured to render audio to one or more virtual speakers. For example, a MR system may present audio to a user as originating from one of six virtual speakers arranged in a speaker array around the user's head. In some embodiments, virtualizer 910 can be configured to determine what sound, or combination of sounds, should be played at which virtual speaker, or combination of speakers, in a virtual speaker array.

In the example embodiment illustrated in FIG. 9A, audio stream 912 and audio stream 914 may be rendered by rendering layer 902. In some embodiments, audio stream 912 may correspond to an audio stream originating from a first application, and audio stream 914 may correspond to an audio stream originating from a second application. In some embodiments, the first application may use the same audio model as the second application, and the first and second applications may be concurrently running on a MR system. In some embodiments, rendering audio stream 912 and audio stream 914 together may be more efficient than rendering the audio streams separately (e.g., because both audio streams may rely on the same audio model). For example, a direct path corresponding to audio stream 912 and audio stream 914 may be rendered and may be passed to virtualizer 910. In some embodiments, audio stream 912 and audio stream 914 may be rendered using the same direct path calculations (e.g., because the same real and/or virtual objects may be obstructing a direct path between one or more sound sources and one or more listening nodes).

In some embodiments, audio stream 912 and audio stream 914 can be rendered together through reflections layer 906. In some embodiments, reflections layer 906 can receive one or more input audio streams from direct layer 904. In some embodiments, reflections layer 906 can receive one or more input audio streams directly from an application (e.g., without passing through direct layer 904 first). In some embodiments, rendering audio stream 912 and audio stream 914 together may be more efficient than rendering the audio streams separately. For example, the same set of filters may be applied to both audio streams (and/or a single audio stream corresponding to a mix of the two audio streams) to approximate reflective behavior. In some embodiments, rendered reflections can be passed to virtualizer 910.

In some embodiments, audio stream 912 and audio stream 914 can be rendered together through reverberations layer 908. In some embodiments, reverberations layer 908 can receive one or more input audio streams from reflections layer 906 and/or direct layer 904. In some embodiments, reverberations layer 908 can receive one or more input audio streams directly from an application (e.g., without passing through reflections layer 906 and/or direct layer 904). In some embodiments, rendering audio stream 912 and audio stream 914 together may be more efficient than rendering the audio streams separately. For example, late reverberant behavior may be determined according to a shared audio model and the late reverberant behavior may be applied to both audio streams. In some embodiments, rendered reverberant behavior can be passed to virtualizer 910.

Figure 9B:
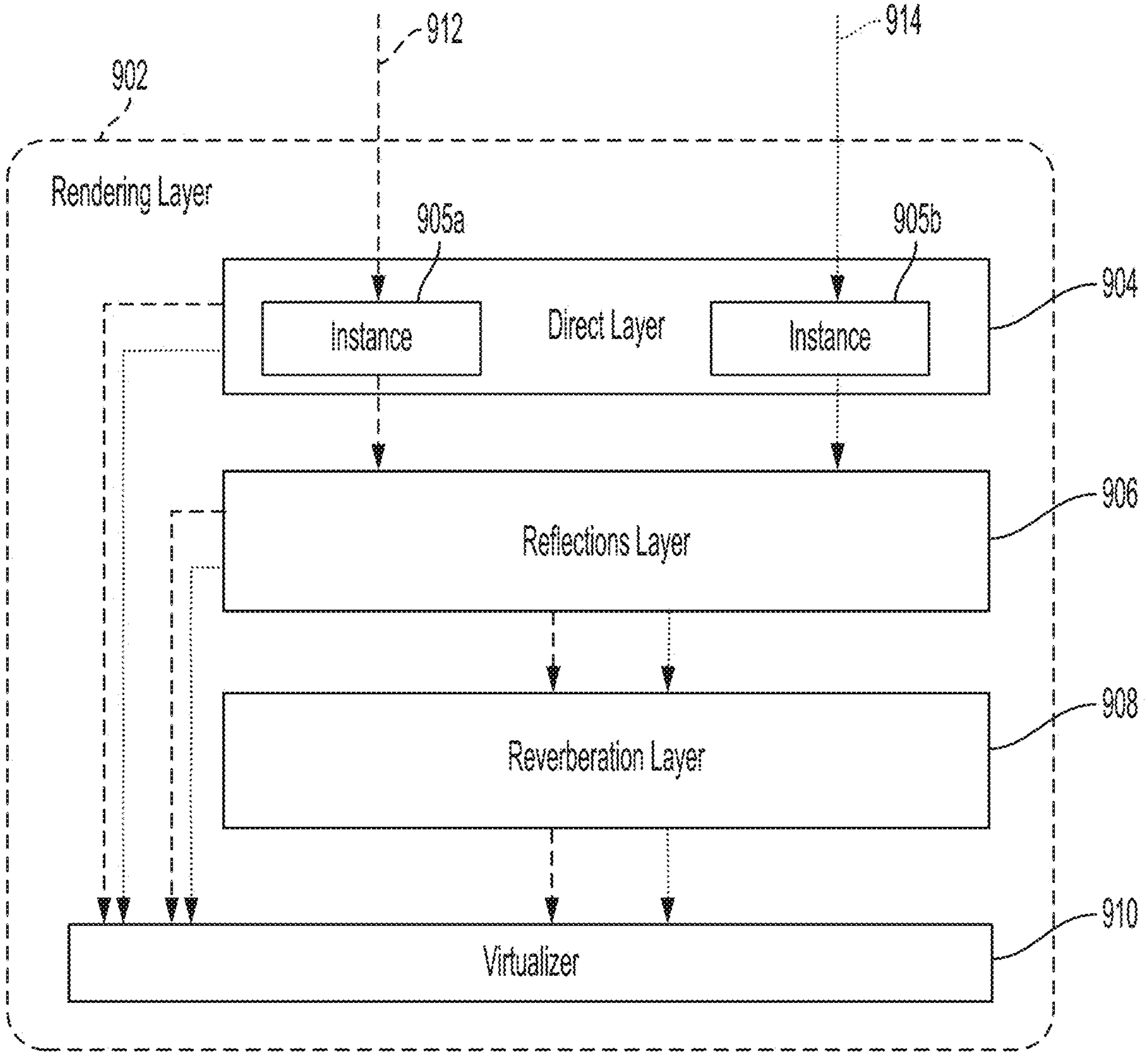

FIG. 9B illustrates a rendering architecture, according to some embodiments. In some embodiments, multiple audio streams that rely on different audio models may be rendered together. For example, audio stream 912 may originate from a first application using a first audio model, and audio stream 914 may originate from a second application using a second audio model. In some embodiments, the first audio model may include a model component corresponding to a virtual object that may not be present in the second audio model (e.g., because the first application has introduced a virtual object that the second application may not utilize). In some embodiments, the virtual object introduced by the first application may affect a direct rendering path for audio stream 912 (e.g., the direct sound may be occluded as a result of the obstruction), but may not affect a direct rendering path for audio stream 914. In some embodiments, audio stream 912 and audio stream 914 may be rendered in separate instances at direct layer 904. In some embodiments, audio stream 912 and audio stream 914 may each be rendered independently at direct layer 904.

In some embodiments, other model components may be shared between audio stream 912 and audio stream 914. For example, the virtual object may be configured to not interfere with audio reflections, and audio stream 912 and audio stream 914 can be rendered using the same reflections calculations at reflections layer 906. In some embodiments, the virtual object may not affect late reverberations of a MRE, and audio streams 912 and 914 may be rendered using the same reverberation calculations at reverberations layer 908. In some embodiments, audio streams 912 and 914 can both be mixed together at virtualizer 910.

In some embodiments, efficiencies can be leveraged when audio streams 912 and 914 rely on shared model components (even though there may also be one or more differences in model components). For example, reflection, reverberation, and virtualizer calculations may be shared across audio streams, even when a direct path may require independent calculations across the two audio streams.

Although FIG. 9B illustrates a rendering architecture with different direct path instances, other embodiments are also contemplated. For example, audio stream 912 may correspond to a first application that changes a virtual object material composition to be more reflective of audio (as compared to audio stream 914, which may correspond to a second application that has not modified the virtual object material composition). In some embodiments, audio stream 912 and audio stream 914 may be rendered together at direct layer 904, but may be rendered separately (e.g., in separate instances) at reflections layer 906. In some embodiments, audio stream 912 and audio stream 914 can be rendered together again at reverberations layer 908 (e.g., because model components corresponding to late reverberations are shared between audio models relied upon by audio streams 912 and 914).

Although FIGS. 9A-9B illustrate a rendering architecture including direct layer 904, reflections layer 906, reverberations layer 908, and virtualizer 910, other architectures may be used as well. In some embodiments, one or more layers may not be included in a rendering architecture (e.g., due to computational limits). In some embodiments, one or more layers may be added to more realistically model acoustic behavior.

Example systems, methods, and computer-readable media are disclosed. According to some examples, a system comprises one or more speakers; and one or more processors configured to execute a method comprising: receiving a request to present a first audio track, wherein the first audio track is based on a first audio model comprising a shared model component and a first model component; receiving a request to present a second audio track, wherein the second audio track is based on a second audio model comprising the shared model component and a second model component; rendering a sound based on the first audio track, the second audio track, the shared model component, the first model component, and the second model component; and presenting, via the one or more speakers, an audio signal comprising the rendered sound. In some examples, rendering the sound comprises rendering the first audio track and the second audio track based on the shared model component. In some examples, rendering the sound comprises rendering the first audio track based on the first audio component. In some examples, rendering the sound comprises rendering the second audio track based on the second audio component. In some examples, the one or more speakers are speakers of a head-wearable device. In some examples, the first audio model is based on a physical environment of the head-wearable device. In some examples, the shared model component corresponds to direct path acoustic behavior. In some examples, the shared model component corresponds to reflective acoustic behavior. In some examples, the shared model component corresponds to reverberant acoustic behavior.

According to some examples, a method comprises: receiving a request to present a first audio track, wherein the first audio track is based on a first audio model comprising a shared model component and a first model component; receiving a request to present a second audio track, wherein the second audio track is based on a second audio model comprising the shared model component and a second model component; rendering a sound based on the first audio track, the second audio track, the shared model component, the first model component, and the second model component; and presenting, via one or more speakers, an audio signal comprising the rendered sound. In some examples, rendering the sound comprises rendering the first audio track and the second audio track based on the shared model component. In some examples, rendering the sound comprises rendering the first audio track based on the first audio component. In some examples, rendering the sound comprises rendering the second audio track based on the second audio component. In some examples, presenting the audio signal comprises presenting the audio signal via one or more speakers of a head-wearable device. In some examples, the first audio model is based on a physical environment of the head-wearable device. In some examples, the shared model component corresponds to direct path acoustic behavior. In some examples, the shared model component corresponds to reflective acoustic behavior. In some examples, the shared model component corresponds to reverberant acoustic behavior.

According to some examples, a non-transitory computer-readable medium stores instructions that, when executed by one or more processors, cause the one or more processors to execute a method comprising: receiving a request to present a first audio track, wherein the first audio track is based on a first audio model comprising a shared model component and a first model component; receiving a request to present a second audio track, wherein the second audio track is based on a second audio model comprising the shared model component and a second model component; rendering a sound based on the first audio track, the second audio track, the shared model component, the first model component, and the second model component; and presenting, via one or more speakers, an audio signal comprising the rendered sound. In some examples, rendering the sound comprises rendering the first audio track and the second audio track based on the shared model component. In some examples, rendering the sound comprises rendering the first audio track based on the first audio component. In some examples, rendering the sound comprises rendering the second audio track based on the second audio component. In some examples, presenting the audio signal comprises presenting the audio signal via one or more speakers of a head-wearable device. In some examples, the first audio model is based on a physical environment of the head-wearable device. In some examples, the shared model component corresponds to direct path acoustic behavior. In some examples, the shared model component corresponds to reflective acoustic behavior. In some examples, the shared model component corresponds to reverberant acoustic behavior.

Although the disclosed examples have been fully described with reference to the accompanying drawings, it is to be noted that various changes and modifications will become apparent to those skilled in the art. For example, elements of one or more implementations may be combined, deleted, modified, or supplemented to form further implementations. Such changes and modifications are to be understood as being included within the scope of the disclosed examples as defined by the appended claims.

The invention claimed is:

1. A system comprising:
- a head-wearable device;
- one or more speakers; and
- one or more processors configured to execute a method comprising:
  - receiving, at an audio service, from a first application associated with the head-wearable device, a request to present a first audio track;
  - determining, based on a location of the head-wearable device in a mixed reality environment, a shared model component, wherein the shared model component is associated with an acoustic property of the mixed reality environment;
  - creating a copy of the shared model component;
  - determining whether to update the shared model component;
  - in accordance with a determination to update the shared model component, updating the copy of the shared model component;
  - in accordance with a determination to not update the shared model component, forgoing updating the copy of the shared model component;
  - determining a first model component corresponding to the first application;
  - rendering a first sound based on the first audio track and based further on a first audio model comprising the shared model component and further comprising the first model component, wherein the rendering the first sound is based on an output of a calculation, via the shared model component, of the acoustic property;
  - receiving, at the audio service, from a second application associated with the head-wearable device, a request to present a second audio track;
  - determining a second model component corresponding to the second application;
  - rendering a second sound based on the second audio track and based further on a second audio model comprising the shared model component and further comprising the second model component, wherein the rendering the second sound is based on the output of the calculation, via the shared model component, of the acoustic property;
  - in accordance with the determination to update the shared model component, updating the shared model component after said rendering the first sound and said rendering the second sound;
  - in accordance with the determination to not update the shared model component, forgoing updating the shared model component; and
  - presenting, via the one or more speakers, an audio signal comprising the first sound and the second sound.

2. The system of claim 1, wherein the first audio model comprises material data associated with one or more objects associated with the first application.

3. The system of claim 2, wherein the material data comprises one or more of an audio reflectivity parameter, a transmissivity parameter, an absorption parameter, a scattering parameter, and a diffraction parameter.

4. The system of claim 1, wherein the first audio model further comprises data associated with a virtual sound source.

5. The system of claim 1, wherein the method further comprises storing, via the audio service, an association between the first application and the first audio model.

6. The system of claim 1, wherein the first audio model is based on a physical environment of the head-wearable device.

7. The system of claim 1, wherein the acoustic property comprises direct path acoustic behavior.

8. The system of claim 1, wherein the acoustic property comprises reflective acoustic behavior.

9. The system of claim 1, wherein the acoustic property comprises reverberant acoustic behavior.

10. The method of claim 1, wherein the determining whether to update the shared model component comprises determining whether a threshold condition is met.

11. A method comprising:
- receiving, at an audio service, from a first application associated with a head-wearable device, a request to present a first audio track;
- determining, based on a location of the head-wearable device in a mixed reality environment, a shared model component, wherein the shared model component is associated with an acoustic property of the mixed reality environment;
- creating a copy of the shared model component;
- determining whether to update the shared model component;
- in accordance with a determination to update the shared model component, updating the copy of the shared model component;
- in accordance with a determination to not update the shared model component, forgoing updating the copy of the shared model component;
- determining a first model component corresponding to the first application;
- rendering a first sound based on the first audio track and based further on a first audio model comprising the shared model component and further comprising the first model component, wherein the rendering the first sound is based on an output of a calculation, via the shared model component, of the acoustic property;
- receiving, at the audio service, from a second application associated with the head-wearable device, a request to present a second audio track;
- determining a second model component corresponding to the second application;

rendering a second sound based on the second audio track and based further on a second audio model comprising the shared model component and further comprising the second model component, wherein the rendering the second sound is based on the output of the calculation, via the shared model component, of the acoustic property;

in accordance with the determination to update the shared model component, updating the shared model component after said rendering the first sound and said rendering the second sound;

in accordance with the determination to not update the shared model component, forgoing updating the shared model component; and presenting, via one or more speakers of the head-wearable device, an audio signal comprising the first sound and the second sound.

12. The method of claim 11, wherein the first audio model comprises material data associated with one or more objects associated with the first application.

13. The method of claim 12, wherein the material data comprises one or more of an audio reflectivity parameter, a transmissivity parameter, an absorption parameter, a scattering parameter, and a diffraction parameter.

14. The method of claim 11, wherein the first audio model further comprises data associated with a virtual sound source.

15. The method of claim 11, further comprising storing, via the audio service, an association between the first application and the first audio model.

16. The method of claim 11, wherein the first audio model is based on a physical environment of the head-wearable device.

17. The method of claim 11, wherein the acoustic property comprises direct path acoustic behavior.

18. The method of claim 11, wherein the acoustic property comprises reflective acoustic behavior.

19. The method of claim 11, wherein the acoustic property comprises reverberant acoustic behavior.

20. A non-transitory computer-readable medium storing instructions that, when executed by one or more processors, cause the one or more processors to execute a method comprising:

receiving, at an audio service, from a first application associated with a head-wearable device, a request to present a first audio track;

determining, based on a location of the head-wearable device in a mixed reality environment, a shared model component, wherein the shared model component is associated with an acoustic property of the mixed reality environment;

creating a copy of the shared model component;

determining whether to update the shared model component;

in accordance with a determination to update the shared model component, updating the copy of the shared model component;

in accordance with a determination to not update the shared model component, forgoing updating the copy of the shared model component;

determining a first model component corresponding to the first application;

rendering a first sound based on the first audio track and based further on a first audio model comprising the shared model component and further comprising the first model component, wherein the rendering the first sound is based on an output of a calculation, via the shared model component, of the acoustic property;

receiving, at the audio service, from a second application associated with the head-wearable device, a request to present a second audio track;

determining a second model component corresponding to the second application;

rendering a second sound based on the second audio track and based further on a second audio model comprising the shared model component and further comprising the second model component, wherein the rendering the second sound is based on the output of the calculation, via the shared model component, of the acoustic property;

in accordance with the determination to update the shared model component, updating the shared model component after said rendering the first sound and said rendering the second sound;

in accordance with the determination to not update the shared model component, forgoing updating the shared model component; and presenting, via one or more speakers of the head-wearable device, an audio signal comprising the first sound and the second sound.

21. The non-transitory computer-readable medium of claim 20, wherein the first audio model comprises material data associated with one or more objects associated with the first application.

22. The non-transitory computer-readable medium of claim 20, wherein the material data comprises one or more of an audio reflectivity parameter, a transmissivity parameter, an absorption parameter, a scattering parameter, and a diffraction parameter.

23. The non-transitory computer-readable medium of claim 20, wherein the first audio model further comprises data associated with a virtual sound source.

24. The non-transitory computer-readable medium of claim 20, wherein the method further comprises storing, via the audio service, an association between the first application and the first audio model.

25. The non-transitory computer-readable medium of claim 20, wherein the first audio model is based on a physical environment of the head-wearable device.

26. The non-transitory computer-readable medium of claim 20, wherein the acoustic property comprises direct path acoustic behavior.

27. The non-transitory computer-readable medium of claim 20, wherein the acoustic property comprises reflective acoustic behavior.

28. The non-transitory computer-readable medium of claim 20, wherein the acoustic property comprises reverberant acoustic behavior.

* * * * *